US007146606B2

(12) United States Patent
Mitchell et al.

(10) Patent No.: US 7,146,606 B2
(45) Date of Patent: *Dec. 5, 2006

(54) GENERAL PURPOSE INTERMEDIATE REPRESENTATION OF SOFTWARE FOR SOFTWARE DEVELOPMENT TOOLS

(75) Inventors: Charles L. Mitchell, Kirkland, WA (US); Julian Burger, Bothell, WA (US); Vinod K. Grover, Mercer Island, WA (US); David Read Tarditi, Jr., Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 390 days.

(21) Appl. No.: 10/625,892

(22) Filed: Jul. 22, 2003

(65) Prior Publication Data

US 2004/0268331 A1  Dec. 30, 2004

Related U.S. Application Data

(63) Continuation-in-part of application No. 10/607,601, filed on Jun. 27, 2003, and a continuation-in-part of application No. 10/610,692, filed on Jun. 30, 2003, and a continuation-in-part of application No. 10/609,275, filed on Jun. 26, 2003.

(51) Int. Cl.
  *G06F 9/45* (2006.01)
(52) U.S. Cl. ..................................... 717/141
(58) Field of Classification Search ................ 717/141
  See application file for complete search history.

(56) References Cited

U.S. PATENT DOCUMENTS

| 4,197,978 | A | | 4/1980 | Kasper |
| 5,339,419 | A | * | 8/1994 | Chan et al. ............... 717/147 |
| 5,488,727 | A | | 1/1996 | Agrawal et al. |
| 5,598,560 | A | * | 1/1997 | Benson .................... 717/159 |
| 5,628,016 | A | | 5/1997 | Kukol |
| 5,696,974 | A | | 12/1997 | Agrawal et al. |
| 5,742,828 | A | | 4/1998 | Canady et al. |
| 5,768,595 | A | | 6/1998 | Gillies |
| 5,778,233 | A | | 7/1998 | Besaw et al. |
| 5,857,105 | A | | 1/1999 | Ayers et al. |
| 5,918,235 | A | | 6/1999 | Kirshenbaum et al. |
| 5,937,195 | A | | 8/1999 | Ju et al. |
| 5,943,499 | A | | 8/1999 | Gillies et al. |
| 5,966,702 | A | | 10/1999 | Fresko et al. |
| 5,999,739 | A | | 12/1999 | Soni et al. |

(Continued)

FOREIGN PATENT DOCUMENTS

WO  WO 01/48607  7/2001

OTHER PUBLICATIONS

Tarditi et al.; "No Assembly Required: Compiling Standard ML to C"; Kluwer Academic Publishers, 1990; pp. 1-16.

(Continued)

*Primary Examiner*—John Chavis
(74) *Attorney, Agent, or Firm*—Klarquist Sparkman, LLP

(57) ABSTRACT

Various intermediate representation techniques for software development tool scenarios are described. An intermediate representation format can be used for both high level and low level representations. The intermediate representation can be built from various operands and instructions types. Various annotations can be added to the intermediate representation without modifying its format. For example, flow control and data control can be explicitly represented by threading a graph through the intermediate representation.

45 Claims, 14 Drawing Sheets

U.S. PATENT DOCUMENTS

| | | | |
|---|---|---|---|
| 6,009,273 | A | 12/1999 | Ayers et al. |
| 6,070,011 | A | 5/2000 | Liu et al. |
| 6,148,302 | A | 11/2000 | Beylin et al. |
| 6,149,318 | A | 11/2000 | Chase et al. |
| 6,182,284 | B1 | 1/2001 | Sreedhar et al. |
| 6,202,204 | B1* | 3/2001 | Wu et al. .................. 717/151 |
| 6,247,169 | B1 | 6/2001 | DeLong |
| 6,249,910 | B1 | 6/2001 | Ju et al. |
| 6,253,304 | B1 | 6/2001 | Hewitt et al. |
| 6,289,446 | B1 | 9/2001 | Nilsson |
| 6,353,924 | B1 | 3/2002 | Ayers et al. |
| 6,363,522 | B1 | 3/2002 | Click et al. |
| 6,374,368 | B1 | 4/2002 | Mitchell et al. |
| 6,412,109 | B1 | 6/2002 | Ghosh |
| 6,421,667 | B1 | 7/2002 | Codd et al. |
| 6,460,178 | B1 | 10/2002 | Chan et al. |
| 6,481,008 | B1 | 11/2002 | Chaiken et al. |
| 6,625,804 | B1 | 9/2003 | Ringseth et al. |
| 6,625,808 | B1 | 9/2003 | Tarditi |
| 6,662,356 | B1 | 12/2003 | Edwards et al. |
| 6,678,805 | B1 | 1/2004 | Corduneanu et al. |
| 6,745,383 | B1 | 6/2004 | Agarwal et al. |
| 6,748,584 | B1 | 6/2004 | Witchel et al. |
| 2002/0083425 | A1 | 6/2002 | Gillies et al. |
| 2002/0095667 | A1* | 7/2002 | Archambault ............... 717/154 |
| 2002/0166115 | A1 | 11/2002 | Sastry |
| 2002/0170044 | A1 | 11/2002 | Tarditi et al. |
| 2003/0101335 | A1 | 5/2003 | Gillies et al. |
| 2003/0101380 | A1 | 5/2003 | Chaiken et al. |
| 2003/0217196 | A1 | 11/2003 | Chan et al |
| 2003/0217197 | A1 | 11/2003 | Chan et al. |
| 2003/0226133 | A1 | 12/2003 | Grover |
| 2004/0025152 | A1 | 2/2004 | Ishizaki et al. |
| 2004/0049769 | A1 | 3/2004 | Lueh et al. |
| 2004/0098710 | A1* | 5/2004 | Radigan .................... 717/144 |

OTHER PUBLICATIONS

Okasaki et al.; "Call-by-Need and Continuation-passing Style"; Lisp and Symbolic Computation: An International Journal; Kluwer Academic Publishers, 1993; pp. 1-25.
Johnson et al.; "Dependence-Based Program Analysis"; ACM SIGPLAN'93 PLDI, Jun. 1993; pp. 1-12.
Ayguade et al.; "A Uniform Internal Representation for High-Level and Instruction-Level Transformations"; 1994; pp. 1-25.
Weaver et al.; "Score: A Compiler Representation for Heterogeneous Systems"; Dec. 1995; pp. 1-14.
Saito et al.; "PROMIS IR Design"; Sep. 29, 1997; pp. 1-4.
Saito et al.; "PROMIS IR Implementation—AST Components—"; Sep. 29, 1997; pp. 1-4.
Polychronopoulos et al.; "The Promis Compiler Project—Annual Report"; Oct. 1, 1997; pp. 1-15.
Cho et al.; "High-Level Information—An Approach for Integrating Front-End and Back-End Compiler"; Aug. 1998; pp. Cover page and 1-19.
Larus; "Whole Program Paths"; Proceedings of the SIGNPLAN'99 Conference on Programming Language Design and Implementation (PLDI99), May 1999; pp. 1-11.
Fitzgerald et al.; "Marmot: An Optimizing Compiler for Java"; Technical Report MSR-TR-99-33; Jun. 16, 1999; pp. cover page and 1-29.
Fitzgerald et al.; "The Case Profile-Directed Selection of Garbage Collectors"; 2000; pp. 1-10.
"1.3 Compiler Architecture" http://1ambda.uta.edu/cse5317/notes/node5.html visited on May 20, 2003; pp. 1-2.
"Implementation of a Parallelizing Compiler with a Universal Intermediate Representations: Translating of Source Codes into Universal Intermediate Representations" http://www.ipsj.or.jp/members.SIGNotes/Eng/22/1997/017/article004.html visited on May 20, 2003; pp. 1-2.
"Scale Download"; Dept. of Computer Science, University of Massachusetts Amherst; http://www-ali.cs.umass.edu/Scale/download.html visited on May 20, 2003; pp. 1-13.
"Overview of the SA-C Compiler" http://www.cs.colostate.edu/Cameron/compiler.html visited on May 20, 2003; pp. 1-2.
"PROMIS Release Announcement" http://www.csrd.uiuc.edu/promis/release_announcement.html visited on May 20, 2003; pp. 1-3.
"Scale"; Dept. of Computer Science, University of Massachusetts Amherst; http://www-ali.cs.umass.edu/Scale/ visited on May 20, 2003; pp. 1-46.
"CIL: Infrastructure for C Program Analysis and Transformation"; May 30, 2003; pp. 1-54.
"PROMIS Implementation—The Illinois-Irvine PROMIS Team" http://www.csrd.uiuc.edu/promis/ visited on Jun. 4, 2003; pp. 1-32.
"Illinois-Irvine PROMIS Compiler Internal Representation" http://www.csrd.uiuc.edu/promis/ visited on Jun. 4, 2003; pp. 1-17.
"Technical Overview" http://www.csrd.uiuc.edu/promis/overview.html visited on Jun. 4, 2003; pp, 1-2.
"A Parallelizing Compiler Framework" http://www.csrd.uiuc.edu/promis/home.html visited on Jun. 4, 2003; pp. 1-2.
"Demystifying .NET Compilation" http://www.zdnet.com.au/printfriendly?AT=2000035027-20264543 visited on Jul. 14, 2003; pp. 1-4, including 1 page of "Figure A".
Ramsey and Jones, "A single intermediate language that supports multiple implementations of exceptions," May 2000, ACM SIGPLAN Notices, PLDI 2000, vol. 35, Issue 5, ISBN:1-58113-199-2, pp. 285-298.
Choi et al., "Efficient and precise modeling of exceptions for the analysis of Java programs," Sep. 1999, ACM SIGSOFT Software Engineering Notes, PASTE '99, vol. 24 Issue 5, ISSN:0163-5948, pp. 21-31.
Hennessy "Program optimization and exception handling," Jan. 1981, Proceedings of the 8th ACM SIGPLAN-SIGACT symposium on Principles of programming languages, ISBN:0-89791-029-X, pp. 200-206.
Woo et al., "Alias analysis for exceptions in Java," Jan. 2002, Australian Computer Science Communications, ACSC2002, vol. 24, Issue 1, ISBN-ISSN;1445-1336, 0-909925-82-8, pp. 321-329.
Robillard et al., "Analyzing exception flow in Java programs," Oct. 1999, ACM SIGSOFT Software Engineering Notes ESEC/FSE-7, vol. 24, Issue 6, ISBN:3-540-66538-2 pp. 322-337.
Gosling "Java intermediate bytecodes," Mar. 1995, ACM SIGPLAN Notices, IR '95, vol. 30, Issue 3, ISSN:0362-1340, pp. 111-118.
Burke et al., "The Jalapeño dynamic optimizing compiler for Java," Jun. 1999, Proceedings of the ACM 1999 conference on Java Grande, ISBN:1-58113-161-5, pp. 129-141.
Litwak, "PURE Java™ 2," Dec. 1999, Sams Publishing, ISBN:0-672-31654-4, Chapter 10.
Kienle, "A SUIF Java Compiler," Aug. 1998, University of California Santa Barbara, Technical Report TRCS98-18, Section 5.9, 6.9, 8.3, and 9.2.15.
"C/C++Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.
International Search Report, Sep. 1, 2005, PCT/US04/15965, 13 pages.
Arnold et al., "Exploring the Interaction between Java's Implicitly Thrown Exceptions and Instruction Scheduling", International Journal of Parallel Programming, vol. 29, Issue 2, Apr. 2001, pp. 111-137.
Gupta et al., "Optimizing Java Programs in the Presence of Exceptions", 2000, Lecture Notes in Computer Science; vol. 1850, ISBN:3-540-67660-0, pp. 422-446.
"Common Language Infrastructure (CLI), Partition 1: Concepts and Architecture," ECMA TC39/TG3, Section 11.6, pp. 1-103, Oct. 2002.
"The LEX & YACC Page," http://dinosaur.compilertools.net/, 4 pages, website visited on Jun. 16, 2003.
"SMGN Reference Manual," http://suif.stanford.edu/suif/suif2/doc-2.20-4/, pp. 1-3, May 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.
"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.
"Zephyr Computer Systems Description Languages (CSDL): Generating Machine-Dependent Compiler Parts Using CSDL," http://web.archive.org/web/20000829045324/www.cs.virginia.edu/zephyr/csdl/, 1 page, Aug. 29, 2000.
"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.
"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.
Adl-Tabatabai et al., "Code Reuse in an Optimizing Compiler," ACM SIGPLAN Notices, Proceedings of the Eleventh Annual Conference on Object-Oriented Programming Systems, Languages, and Applications, vol. 31, Issue 10, pp. 51-68, Oct. 1996.
Aigner et al., "An Overview of the SUIF2 Compiler Infrastructure," Technical Report, Computer Systems Laboratory, Stanford University and Portland Group, Inc., pp. 1-14, 2000.
Aigner et al., "SUIF Compiler System: The SUIF Program Representation," Computer Systems Laboratory, Stanford University and The Portland Group, Inc., http://suif.stanford.edu/suif/suif2/doc-2.2.0-4/suifguide/, pp. 1-30, Aug. 14, 2000.
Appel et al., "The Zephyr Compiler Infrastructure," Internal Report, http://www.cs.virginia.edu/zephyr, Princeton University and University of Virginia, pp. 1-10, Nov. 6, 1998.
Ayers et al., "Scalable Cross-Module Optimization," ACM SIGPLAN Notices, Proceedings of the ACM SIGPLAN 1998 Conference on Programming Language Design and Implementation, vol. 33, Issue 5, pp. 301-312, May 1998.
Benitez et al., "Target-Specific Global Code Improvement: Principles and Applications," Technical Report CS-94-92, Department of Computer Science, University of Virginia, pp. 1-14, 1994.
Blickstein et al., "The GEM Optimizing Compiler System," Digital Technical Journal, vol. 4, No. 4, Special Issue, pp. 1-17, 1992.
Brooks et al., "Design of An Optimizing, Dynamically Retargetable Compiler for Common Lisp," Proceedings of the 1986 ACM Conference on Lisp and functional programming, pp. 67-85, Aug. 1986.
Devanbu, "Re-targetability in Software Tools," ACM SIGAPP Applied Computing Review, vol. 7, Issue 3, pp. 19-26, Sep. 1999.
Engler, "VCODE: A Retargetable, Extensible, Very Fast Dynamic Code Generation System," ACM SIGPLAN Notices, Proceedings of the ACM SIGPLAN 1996 Conference on Programming Language Design and Implementation, vol. 31, Issue 5, pp. 160-170, May 1996.
Ganapathi et al., "Retargetable Compiler Code Generation," ACM Computing Surveys (CSUR), vol. 14, Issue 4, pp. 573-592, Dec. 1982.
Goodenough, "Exception Handling: Issues and a Proposed Notation," Communications of the ACM, vol. 18, No. 12, pp. 683-696, Dec. 1975.
Guilan et al., "Retargetable Cross Compilation Techniques—Comparison and Analysis of GCC and Zephyr," *ACM SIGPLAN Notices*, Technical Correspondence, vol. 37, Issue 6, pp. 38-44, Jun. 2002.
Hayes et al., "Component Design of Retargetable Program Analysis Tools that Reuse Intermediate Representations," Proceedings of the 22nd International Conference on Software Engineering, Limerick, Ireland, ACM, pp. 356-365, Jun. 2000.
Heine et al., "Interprocedural Program Analyses," ACM SIGPLAN 2000 Conference on Programming Language Design and Implementation, Vancouver, B.C., 22 pages, http://suif.stanford.edu/suif/suif2/doc-2.2.0-4/tutorial/analysis.ppt, Jun. 2000.
Heine, "An Overview of the SUIF2 Base Infrastructure," ACM SIGPLAN 2000 Conference on Programming Language Design and Implementation, Vancouver, B.C., 30 pages, http://suif.stanford.edu/suif/suif2/doc-2,2.0-4/tutorial/basesuif.ppt, Jun. 2000.
Holzle et al., "OSUIF: SUIF For Objects," ACM SIGPLAN 2000 Conference on Programming Language Design and Implementation, Vancouver, B.C., pp. 1-17, http://suif.stanford.edu/suif/suif2/doc-2,2.0-4/ tutorial/osuif-intro.ps, Jun. 2000.
Kessler et al., "EPIC—A Retargetable, Highly Optimizing Lisp Compiler," ACM SIGPLAN Notices, Proceedings of the 1986 SIGPLAN Symposium on Compiler Construction, vol. 21, Issue 7, pp. 118-130, Jul. 1986.
Khedker et al., "Bidirectional Data Flow Analysis: Myths and Reality," ACM SIGPLAN Notices, vol. 34, No. 6, pp. 47-57, Jun. 1999.
Kienle, "OSUIF: A Closer Look," ACM SIGPLAN 2000 Conference on Programming Language Design and Implementation, Vancouver, B.C., pp. 1-31, http://suif.stanford.edu/suif/suif2/doc-2.2.0-4/ tutorial/osuif-details/ps, Jun. 2000.
Knoop et al., "Lazy Code Motion," In Proceedings of the ACM SIGPLAN '92 Conference on Programming Language Design and Implementation, San Francisco, CA, 11 pages, Jun. 1992.
Knoop et al., "Partial Dead Code Elimination," In Proceedings of the ACM SIGPLAN '94 Conference on Programming Language Design and Implementation, 12 pages, Jun. 1994.
Lam, "An Overview of the SUIF2 System," ACM SIGPLAN '99 Conference on Programming Language Design and Implementation, Atlanta GA, 20 pages, http:suif.stanford.edu/suif/suif2/doc-2.2.0-4/ tutorial/suif-intro.ppt, May 4, 1999.
Lim, "Affine partitioning for Parallelism & Locality," ACM SIGPLAN 2000 Conference on Programming Language Design and Implementation, Vancouver, B.C., 16 pages, http://suif.stanford.edu/suif/suif2/doc-2.2.0-4/ tutorial/affine.ppt, Jun. 2000.
Morel et al., "Global Optimization by Suppression of Partial Redundancies," Communications of the ACM, vol. 22, No. 2, pp. 96-103, Feb. 1979.
Ramsey et al., "Machine Descriptions to Build Tools for Embedded Systems," Proceedings of the ACM SIGPLAN Workshop on Languages, Compilers, and Tools for Embedded Systems, 17 pages, 1998.
Smith, "Machine SUIF," ACM SIGPLAN 2000 Conference on Programming Language Design and Implementation, Vancouver, B.C., 15 pages, Jun. 2000.
Stallman, "Using and Porting the GNU Compiler Collection," 504 pages, http://www.skyfree.org/linux/references/gcc-v3.pdf, Jul. 28, 1999.
Wegbreit, "Property Extraction in Well-Founded Property Sets," IEEE Transactions on Software Engineering, vol. 1, No. 3, pp. 270-285, Sep. 1975.
"Attribute-Based Templates for Microsoft .NET", 2001, newtelligence AG, 7 pages.
Harper et al., "Compiling Polymorphism Using Intensional Type Analysis", ACM Symposium on Principles of Programming Languages, pp. 130-141, Jan. 1995.
Tarditi et al., "TIL: A Type-Directed Optimizing Compiler for ML", 1996 SIGPLAN Conference on Programming Language Design and Implementation, pp. 181-192, May 1996.
Tarditi, "Design and Implementation of Code Optimizations for a Type-Directed Compiler for Standard ML", PhD Thesis, Carnegie Mellon University, 6 pages of introduction and pp. i-266, Dec. 1996 (Available as Technical Report CMU-CS-97-108).
Morrisett et al., "Stack-Based Typed Asssemby Language", Xavier Leroy and Atsushi Ohori, editors, Lecture Notes in Computer Science, vol. 1473, pp. 28-52, Mar. 1998.
Colby et al., "A Certifying Compiler for Java", 2000 SIGPLAN Conference on Programming Language Design and Implementation, pp. 95-107, Vancouver, Canada, Jun. 2000.
Necula, "Compiling With Proofs", PhD thesis, Carnegie Mellon University, 27 pages, Sep. 1998.
Alpern et al., "Detecting Equality of Variables in Programs"Proceedings of the 15th ACM SIGPLAN-SIGACT Symposium on Principles of Programming Languages, pp. 1-11, 1988.

Bacon, "Fast and Effective Optimization of Statically Typed, Object-Oriented Languages", Phd thesis, Computer Science Division, University of California, Berkeley, 3 pages of introduction and pp. i-141, 1997.

Bodik et al., "ABCD: Eliminating Array Bounds Checks on Demand", Proceedings of ACM SIGPLAN 2000 Conference on Programming Language Design and Implementation, pp. 321-333.

Cytron, "Efficiently Computing Static Single Assignment Form and the Control Dependence Graph", ACM Transactions on Programming Languages and Systems, pp. 451-490, 1991.

Dean et al., "Optimizations of Object-Oriented Programs Using Static Class Hierachy Analysis", European Conference on Object-Oriented Programming, pp. 77-101, 1995.

Gay et al., "Fast Escape Analysis and Stack Allocation for Object-Based Programs", Proceedings of the 2000 International Conference on Compiler Construction, 12 pages, 2000.

Gupta, "Optimizing Array Bound Checks Using Flow Analysis", ACM Letters on Programming Languages and Systems, pp. 135-150, 1993.

Lengauer et al, "A Fast Algorithm for Finding Dominators in a Flowgraph", ACM Transactions on Programming Languages and Systems, pp. 121-141, 1979.

Mueller et al., "Avoiding Unconditional Jumps by Code Replications", Proceedings of the SIGPLAN '92 Conference on Programming Language Design and iMplementation, pp. 322-330, Jun. 1992.

Ruf, "Effective Synchronization Removal for Java", ACM SIGPLAN Conference on Programming Language Design and Implementation, pp. 208-218, BC, Canada, 2000.

Tarjan, "Testing Flow Graph Reducibility", Proceedings of the Fifth Annual ACM Symposium on Theory of Computing, pp. 96-107, 1973.

Vitek et al., "Efficient Type Inclusion Tests", Proceedings of OOPSLA '97, pp. 142-157, Atlanta, Georgia, 1997.

Sun Microsystems, Inc., "The Java Language Environment: 6—Security in Java, 6.3 The Byte Code Verification Process" http://web.archive.org/web/19990302092957/http://java.sun.com/docs/white/langev/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)", pp. 1-10 (X/Open Company Ltd. 1996).

Cedilla Systems Inc., Products http://web.archive.org/web/20010728193511/www.cedillasystems.com/pages/about/products.html, 2 pages (Jul. 28, 2001).

Lee, A Certifying Compiler for Java http://www-2.cs.cmu.edu/~petel/pcc/pcc-slides/SDIPOP.pdf, 10 pages (Sep. 2000).

Aho et al., "Compilers: Principles, Techniques and Tools", Copyright© 1986 by Bell Telephone Laboratories, Inc., cover and pp. ii, vii-x, 12-14, 463-512, and 585-722.

Appel, "Modern Compiler Implementation in ML", Copyright© Andrew W. Appel, 1998, Cambridge University Press, cover and pp. iv-viii, 148-210, 344-376, and 427-467.

Fraser et al., "A Retargetable C Compiler: Design and Implementation", Copyright© 1995 by AT&T and David R. Hanson, cover and pp. iv, vii-xii, 311-372.

* cited by examiner

GENERAL PURPOSE INTERMEDIATE REPRESENTATION OF SOFTWARE FOR SOFTWARE DEVELOPMENT TOOLS

CROSS REFERENCE TO RELATED APPLICATIONS

This application is a continuation-in-part of U.S. patent application Ser. No. 10/607,601 to Plesko et al., "AN EXTENSIBLE TYPE SYSTEM FOR REPRESENTING AND CHECKING CONSISTENCY OF PROGRAM COMPONENTS DURING THE PROCESS OF COMPILATION," filed Jun. 27, 2003, U.S. patent application Ser. No. 10/609,275 to Grover et al., "AN INTERMEDIATE REPRESENTATION FOR MULTIPLE EXCEPTION HANDLING MODELS," filed Jun. 26, 2003, and U.S. patent application Ser. No. 10/610,692 to Burger, "GENERATING SOFTWARE DEVELOPMENT TOOLS VIA TARGET ARCHITECTURE SPECIFICATION," filed Jun. 30, 2003, all of which are hereby incorporated herein by reference.

COMPUTER PROGRAM LISTING APPENDIX

A portion of the disclosure of this patent document is submitted on one compact disc and is hereby incorporated herein by reference as Computer Program Listing Appendix F. The compact disc contains exactly one file created Jul. 15, 2003, named "AppendixF.txt" (232 kilobytes in size) (Appendix F). An additional, identical compact disc is also included herewith.

TECHNICAL FIELD

The technical field relates to representations of software, such as those used by software development tools (e.g., compilers).

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Executable computer software typically takes the form of instructions and related data. At its lowest level, software is composed of ones and zeros; however, a variety of techniques have been developed so that human programmers can more easily comprehend software. A popular technique is to develop software in the form of source code in any of a variety of languages. The source code takes a human-readable form and often includes human language (e.g., English) words that can be more easily understood, especially for larger software projects. Similarly, even at lower levels, human-readable assembly language (e.g., opcode mnemonics) can be used to specify particular instructions. Eventually, the source or assembly language is compiled or otherwise transformed into a form that a machine (e.g., processor or virtual machine) can execute.

The challenge of translating software from human-readable form to machine-readable form has produced a wide array of software development tools. So that the machine-readable form makes optimal use of computing resources, some software development tools also analyze or transform (e.g., optimize) the software during the translation process.

Because source code is difficult to analyze programmatically in raw form, it is commonly translated into an intermediate representation. Analyses and transformations can then be performed on the intermediate representation, which is eventually converted into object code or some other executable form for a particular machine.

Typically, however, various different representation formats are used for different purposes. For example, a high level representation format is used for some (e.g., machine-independent) transformations, and a low level representation format is used for others (e.g., machine-dependent). Such an approach suffers from various problems. For example, an transformation done at one level may be disrupted or undone at a different level. Further, a technique developed for one format is not usable for another format unless the technique is revised to take the format's idiosyncrasies into account. Thus, there remains room for improving techniques for intermediate representations of software in the software development field.

SUMMARY

The technologies described herein can be used to advantage with intermediate representations of software. For example, various data structures can be used to represent software in an intermediate representation useful for a variety of techniques.

The same intermediate representation format can be used throughout the software development process. For example, the format of the intermediate representation can remain the same during various transformations (e.g., during lowering or optimizations). Thus, the format can represent the software in a machine-independent and a machine-dependent manner.

Type information can be maintained in the intermediate representation. For example, even after lowering, type information related to the source code can be maintained.

The intermediate representation format can accommodate annotations to avoid creation of auxiliary data structures. Such annotations can be used to thread graphs through the intermediate representation format. For example, data flow and control flow can be explicitly represented in the intermediate representation without creating a separate data structure.

A number of other features related to the intermediate representation format can be used for a variety of purposes. Such features can be combined to provide a versatile general-purpose intermediate representation that is appropriate for a wide of software development scenarios. Researchers and developers can thus write tools to the intermediate representation format and leverage their effort across many scenarios.

Additional features and advantages will be made apparent from the following detailed description of illustrated embodiments, which proceeds with reference to the accompanying drawings.

DETAILED DESCRIPTION

EXAMPLE 1

Exemplary Software Tools and Scenarios

Any of the examples described herein can be used in conjunction with a variety of software development tools, such as various types of compilers, assemblers, disassemblers, debuggers, optimizers, simulators, analyzers, and the like.

The tools can be related to any of a variety of software development scenarios. For example, a compiler may compile source code from any of a variety of languages. Object code generated from the intermediate representation may be for any of a variety of target architectures, including any of a variety of processors or virtual machines. The software represented by the intermediate representation may be executed in a managed (e.g., garbage collected) or non-managed environment.

EXAMPLE 2

Exemplary Target Architectures

The target architectures described herein can include any of a variety of hardware machines or virtual machines. A target architecture can include any environment for executing code. Target architectures can include the Intel® x86, AMD, IAx, MIPS, and PowerPC® architectures, as well as other architectures (e.g., RISC or CISC), including those hereafter implemented.

The Intel® x86 architecture includes any processor based on the Intel® x86 architecture, such as the 80×86, 80×88, Intel186, Intel286, Intel386, Intel486, and Pentium processors available from Intel Corporation. The AMD architecture includes the AMD64 and AMD32 architectures available from Advanced Micro Devices (AMD), Inc. The IAx architecture includes the IA32 and IA64 architectures available from Intel Corporation. The MIPS architecture includes the MIPS64™ and MIPS32™ architectures available from MIPS Technologies Inc.

Virtual machines can include any software-based implementation of a code execution engine, which executes virtual machine instructions (e.g., byte codes). If desired, the same virtual machine can execute on a variety of hardware architectures.

EXAMPLE 3

Exemplary Compilation Types

Any of the examples described herein can be applied to support a variety of compilation types. Besides a native optimizing compiler, JIT and pre-JIT scenarios compilation can be supported. For example, JIT compilation can proceed by converting source code into an IL and deferring compilation until a program is launched. Pre-JIT compilation can proceed similar to JIT, but compilation can be performed before launch (e.g., at install time).

EXAMPLE 4

Exemplary Overview of Processing Intermediate Representation of Software

Figure 1:
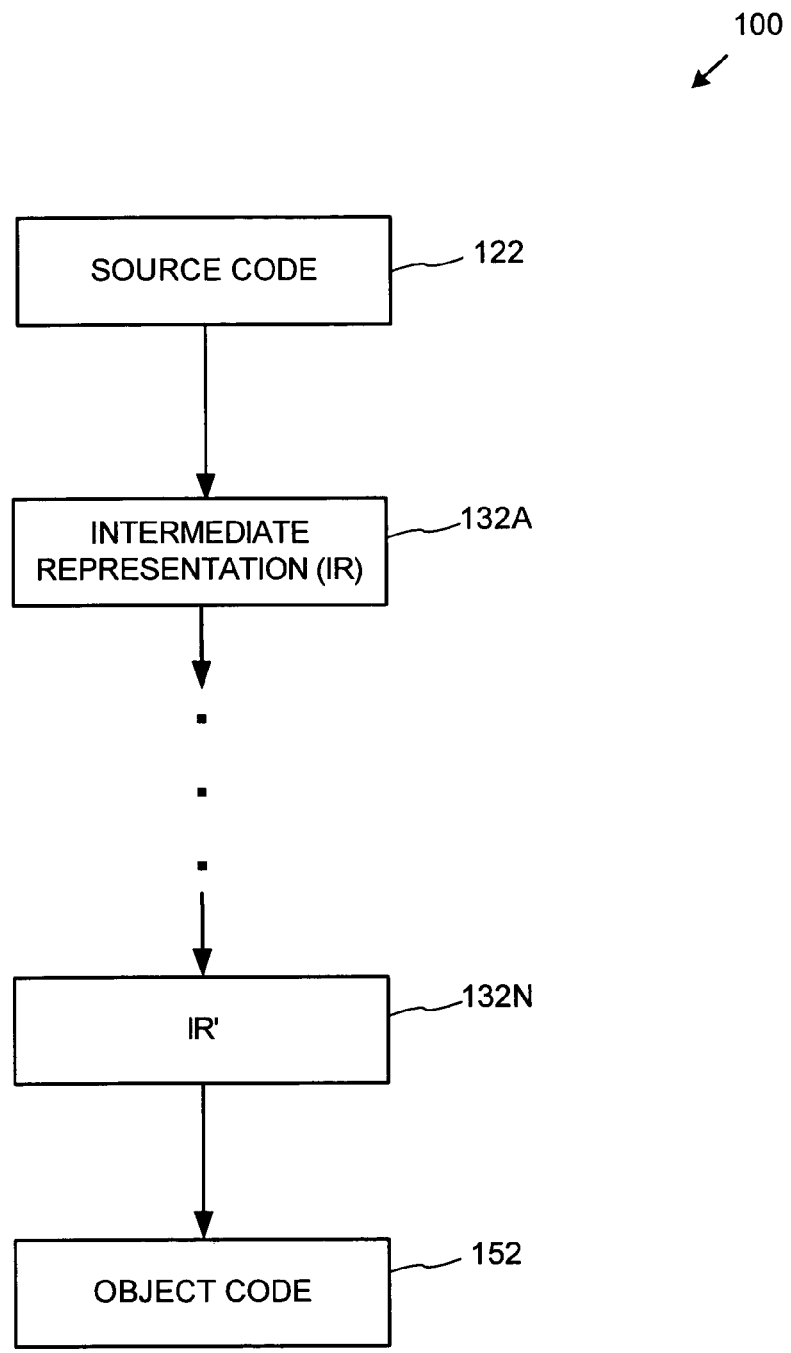
FIG. 1 is a block diagram showing an exemplary overview of processing an intermediate representation of software.

FIG. 1 shows an exemplary overview 100 of processing an intermediate representation of software. Any portions of the representation can be generated or analyzed by one or more software development tools. Source code 122 (e.g., in any of a variety of languages) for the software is converted into an intermediate representation ("IR") 132A, which is then converted into object code or other executable code 152 (e.g., for any of a variety of target architectures) for the software. In some cases, the source code 122 is converted into an intermediate language ("IL") before converted into the IR.

In general, a representation of software at or closer to the source code level is called a "high level" representation, and a representation at or closer to the object code level is called a "low level" representation. The technique of transforming (e.g., refining) a representation of software from high level to low level is sometimes called "lowering" the representation.

The higher level representations are also sometimes called "machine independent" because the particulars of the machine (e.g., hardware processor or virtual machine) are not taken into account. Lower level representations are sometimes called "machine dependent" or "machine specific" because the particulars of the machine are taken into account. For example, a lower level representation may take into account the registers available on a particular processor or explicitly specify a particular register.

In practice, one or more transformed intermediate representations 132A–132N of a same format may be generated throughout the software development process. Such representations can be associated with respective phases of compilation or other software development process. Although progression throughout the representations generally lowers the representation, other transformations can be performed for analysis of the intermediate representation.

Finally, although many of the examples herein describe lowering the intermediate representation, it is also possible to transform the IR in the other direction (i.e., raise the IR) while maintaining a same format. Or, a high level intermediate representation of some instructions can be mixed in the same stream as a low level intermediate representation of other instructions in the same format (e.g., for inline assembly and intrinsics).

EXAMPLE 5

Exemplary Method of Processing Intermediate Representation of Software

Figure 2:
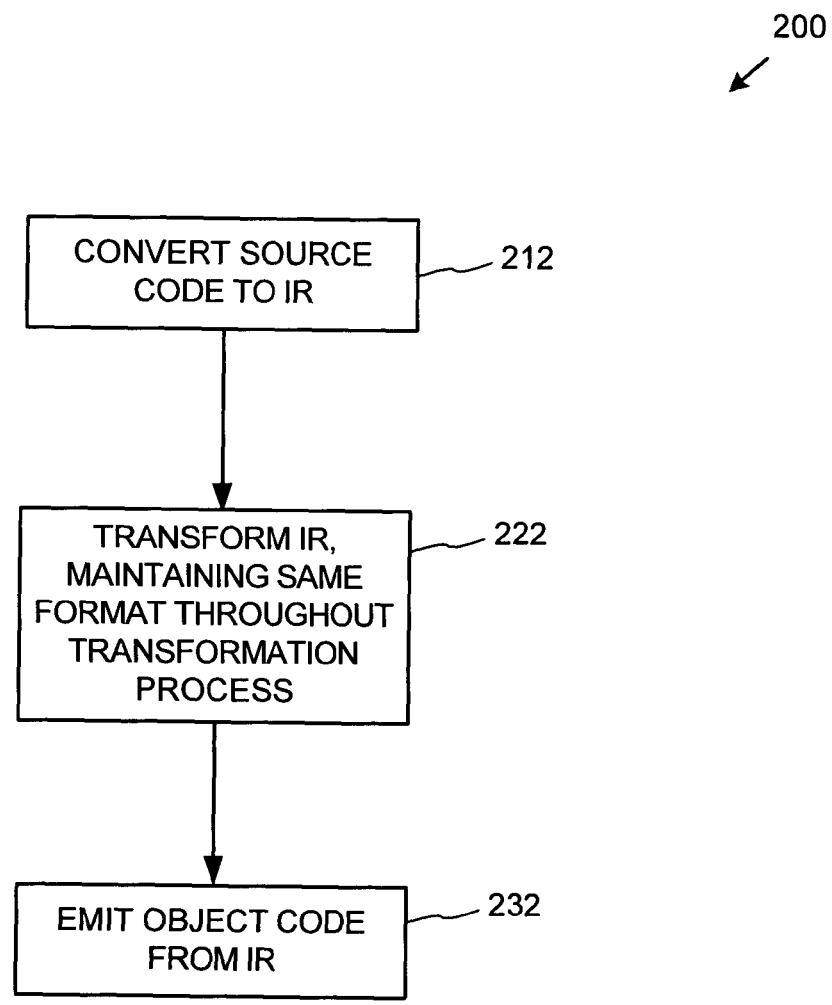
FIG. 2 is a flowchart of a method of processing an intermediate representation of software.

FIG. 2 is a flowchart showing an exemplary method 200 of processing an intermediate representation of software. Any portion of the illustrated method or methods of any of the other examples described herein can be implemented by a computer (e.g., via one or more computer-readable media having computer-executable instructions for performing the method) in software. At 212, source code of the software is converted to an intermediate representation ("IR") of the software.

At 222, the IR is transformed (e.g., lowered) during one or more phases. In any of the examples described herein, the same format can be maintained throughout the transformation process (e.g., during phases of the lowering process). Instead of changing the format during transformation, the IR can be annotated with appropriate information. Also, although the term "lower" is used, in some cases, it may be that a phase does not explicitly lower the representation but rather modifies the IR in some way or merely achieves an analysis of the software represented by the IR.

At 232, the IR is used to generate object or other executable code.

EXAMPLE 6

Exemplary Overview of Phases

In any of the examples described herein, the IR can be used to represent the software throughout a variety of phases, such as those used during transformations or other analysis of the software. During the phases, various annotations can be added to the IR as desired. In this way, auxiliary data structures can be implemented in the IR itself rather than separately.

EXAMPLE 7

Exemplary Data Structures for Storing Intermediate Representation

Figure 3:
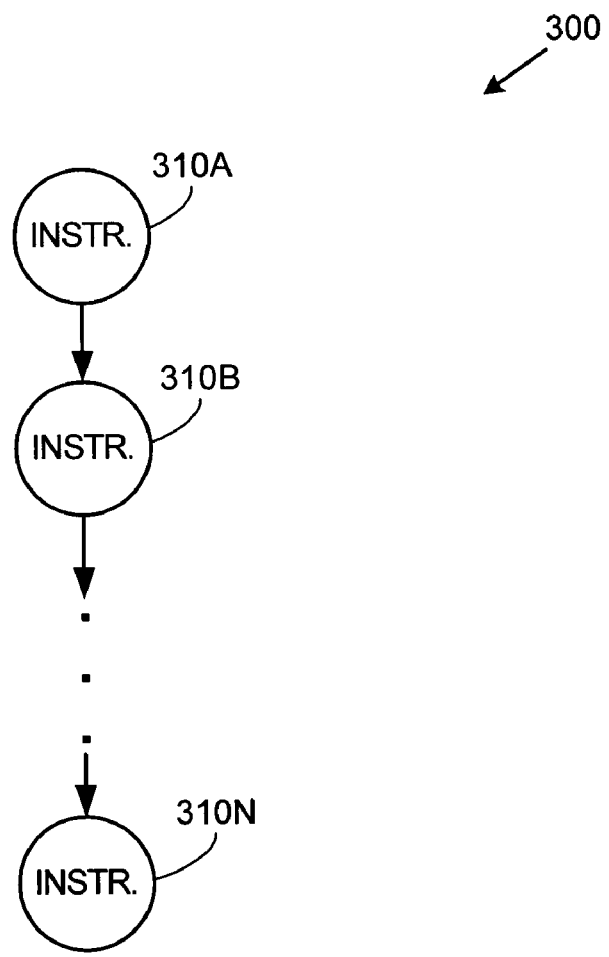
FIG. 3 is a block diagram showing an exemplary arrangement for storing an intermediate representation of software.

FIG. 3 shows an exemplary arrangement for storing an intermediate representation of software. In the example, the intermediate representation comprises a stream 300 of a plurality of instructions represented by nodes 310A–310N. Although links between instructions are shown in one direction, in practice, other arrangements (e.g., doubly-linked) can be used to associate the instructions.

Access to the data structures can be limited to access via properties of the nodes (e.g., via a set of APIs implementing set and get functions). The instructions may equate to actual instructions or other items of the software. For example, certain instruction types may be defined to represent data, labels, boundaries, or compiler directives.

EXAMPLE 8

Exemplary Notation for Instructions

Format (1) shows an exemplary notation for instructions (e.g., for the instructions of the instruction stream 300) in the IR. The notation can be used as a basis for the format of the IR.

$$<dst_1>, <dst_2>, \ldots <dst_n>=\text{Operator } <src_1>, <src_2>, \ldots <src_m> \quad (1)$$

In the example, zero or more destination operands "dst" and zero or more source operands "src" are associated with the operator "Operator." By convention, an equals sign ("=") is included because the instruction can be thought of as an assignment or data flow operation. However, when represented in a data structure, the equals sign can be implied (e.g., not stored explicitly). Because the notation can be used to describe any of a variety of instructions and other operations (e.g., unary, binary, etc.), in practice, an instruction can have any number of source operands, and any number of destination operands. The same notation can thus be used for machine-independent and machine-dependent representations. Certain instruction types, such as labels may be represented in the notation in a different way (e.g., "L1:"), even though they are stored in the same format as the other instruction types.

EXAMPLE 9

Exemplary IR Formats

The instructions described in any of the examples (e.g., the instructions of the instruction stream 300) can be stored in a single format throughout transformations of the IR. The format can take the form of a linked list, an array, a tree, database records, and the like.

In practice, any side-effect of the instruction is represented in the src/dst list (e.g., any effect on the machine results in a change to a listed destination operand). In this way, the IR can completely and explicitly represent the effect of an instruction on the machine. Thus, tools using the IR need not be aware of the idiosyncrasies of the particular operation (e.g., opcode) for the instruction.

Another way of conceptualizing the instruction is to call the instruction a function taking the source operands (e.g., the machine state before the instruction) as input, performing the Operator on them, and generating the destination operands (e.g., the machine state after the instruction) as output. For example, an instruction to be represented can be described via the form as a data flow operation that receives a set of source resources and defines a set of destination resources.

EXAMPLE 10

Exemplary Data Structure Showing Exemplary IR Format

Figure 4A:
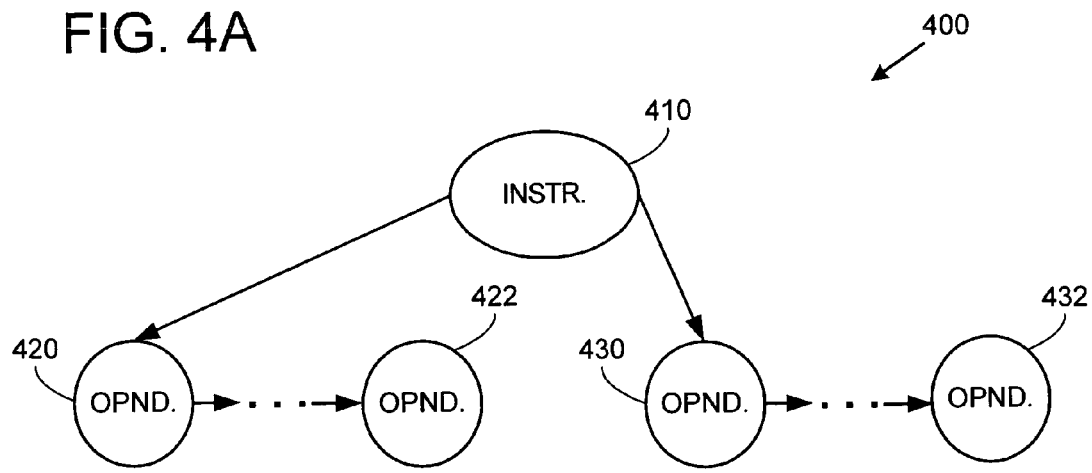
FIGS. 4A and 4B are block diagrams showing exemplary arrangements for storing a representation of an instruction in an intermediate representation format that can accommodate machine-independent and machine-dependent representations of an instruction.

FIG. 4A shows an exemplary data structure 400 representing an instruction, including the associated operands, in an exemplary intermediate representation format that can accommodate machine-independent and machine-dependent representations of an instruction. The exemplary data structure can be stored in one or more computer-readable media, and the format can be used in any of the examples described herein.

In the example, an instruction node 410 makes reference to zero or more source operand nodes 430–432 and zero or more destination operand nodes 420–422. Although links are shown between the operand nodes in the example, a format can take a variety of other approaches (e.g., links from the instruction node 410 to the respective operand nodes). As described herein, the format can accommodate storage of various other information in the nodes.

EXAMPLE 11

Exemplary Technique for Maintaining Format of IR Throughout Transformation

Figure 4B:
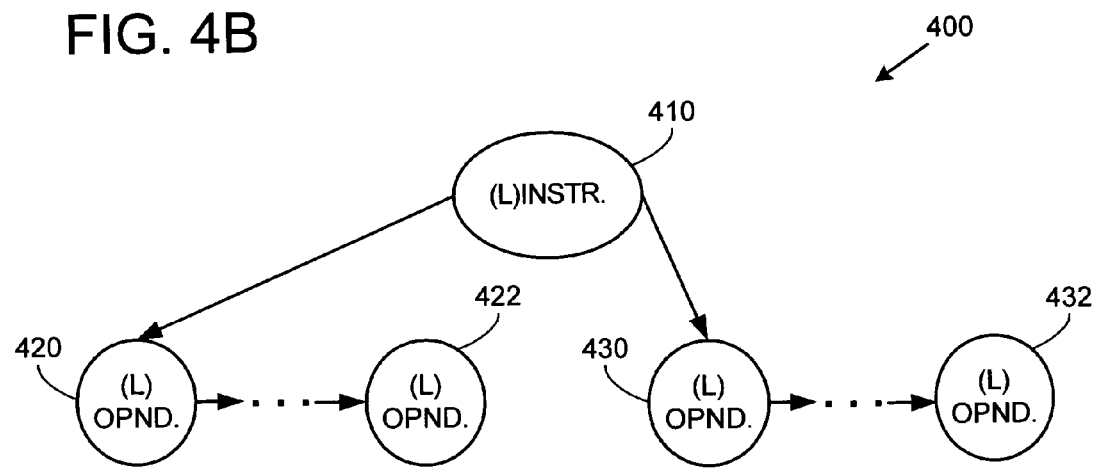

The format of the IR can be maintained during transformation of the IR. For example, FIG. 4B shows the instruction of FIG. 4A after lowering. In the example, the format of the IR remains the same after lowering. The instruction node 410 may contain different information (e.g., an opcode representing the instruction). Similarly, the operands may contain different information (e.g., indicating a memory location rather than a variable name).

The same IR format can thus be maintained throughout the software development process (e.g., throughout the transformation process). In this way, tools can be written to the IR rather than having to create a special-purpose format for the tool. If desired, auxiliary data structures can be created in addition to the data structures of the IR format, but many auxiliary data structures can be integrated into the IR via the IR format without need for creating such auxiliary data structures.

EXAMPLE 12

Exemplary Lowering of the IR

Table 1 shows an exemplary statement that can be represented in the IR format during lowering. For a line of source code, a high-level, machine-independent intermediate representation ("HIR") is shown along with a low-level, machine-dependent intermediate representation ("LIR") of the same source code.

TABLE 1

Exemplary Instruction Lowering

| Level | Instruction(s) |
|---|---|
| Source | z = a + b + c; |
| High-level IR (HIR) | t1 = ADD a, b |
| | t2 = ADD t1, c |
| | z = ASSIGN t2 |
| Low-level IR (LIR) | t1(EAX), OF, SF, ZF, AF, CF, PF = x86add a(EAX), b(EDX) |
| | t2(EAX), OF, SF, ZF, AF, CF, PF = x86add t1(EAX), c (EBX) |
| | z = x86mov t2(EAX) |

In the example, the effect on processor flags (OF, SF, ZF, AF, CF, PF) is explicitly represented in the LIR version to completely represent the effect of the x86add operator on the x86 machine. By the time the IR reaches the LIR (and, in this example the HIR), there can be a one-to-one correspondence between IR instructions and machine instructions. A more complete example showing dumps of the IR for a number of phases for a function "foo (int a, int b)" incorporating the above code is shown in Appendix A.

If desired, the instructions can be defined as objects that emit the proper stream of machine data (e.g., properties taking the form of machine opcodes and operands). If so, generating object code or other executable code can be a simple matter of traversing the IR and emitting the stream of machine data, which can be stored as executable code.

EXAMPLE 13

Exemplary Technique for Representing Software Via the IR Format

Figure 5:
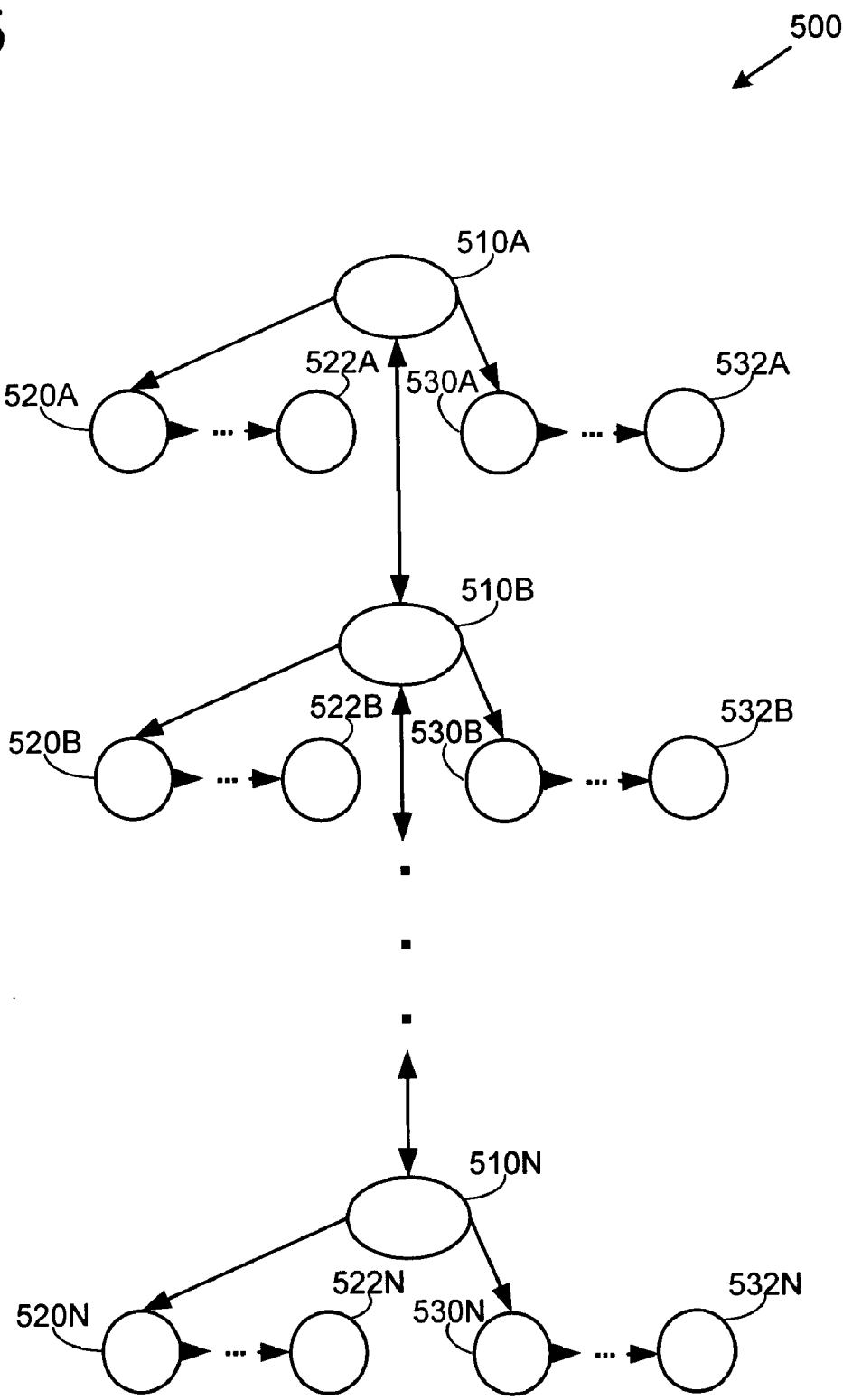
FIG. 5 is a block diagram showing an exemplary arrangement for storing a stream of instructions in an intermediate representation of software.

FIG. 5 shows an exemplary data structure 500 for representing software as a stream of a plurality of instructions 510A–N and associated operands in accordance with the exemplary IR format. In the example, the instructions are linked together in a doubly-linked list; however instructions stored according to the instruction format described above can be stored in any way that associates them (e.g., as a stream of instructions). References in the instructions 510A–N are linked to zero or more respective source operands 530A–N through 532A–N and zero or more respective destination operands 520A–N through 522A–N. The representation 500 can be used to represent any of a variety of software in any of a variety of languages targeted to any of a variety of target architectures.

EXAMPLE 14

Exemplary Technique for Generating Information from the IR

Figure 6A:
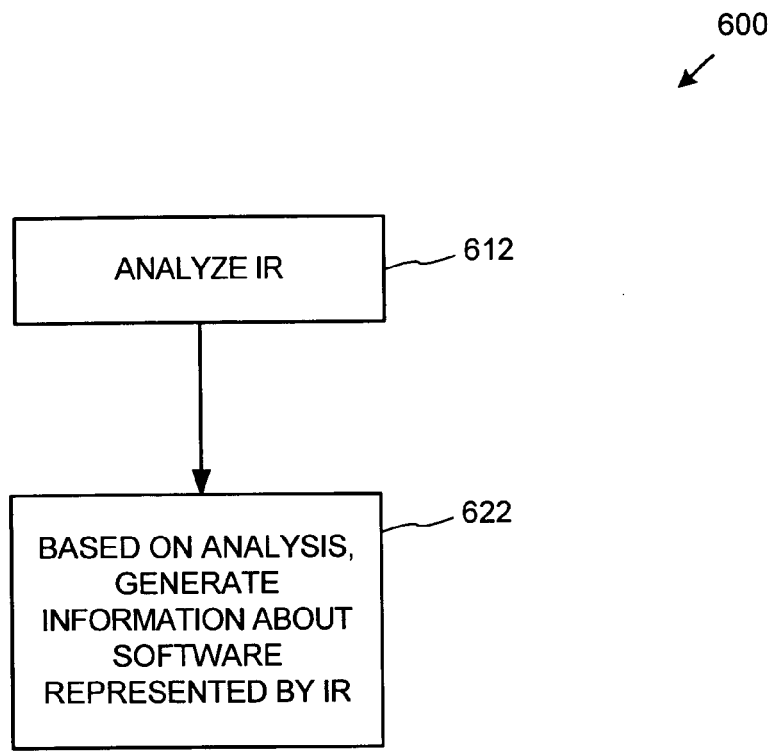
FIGS. 6A and 6B are flowcharts showing exemplary methods for processing an intermediate representation of software.

FIG. 6A is a flowchart of a method 600 for generating information about software from an intermediate representation of the software, such as the intermediate representations shown in any of the examples described herein.

At 612, the IR is analyzed. For example, a software development tool can traverse (e.g., "walk") any of the IR data structures. Then, based on the analysis, at 622, information about the software represented by the IR is generated (e.g., by the software development tool).

EXAMPLE 15

Exemplary Technique for Modifying Annotations of the IR

Figure 6B:
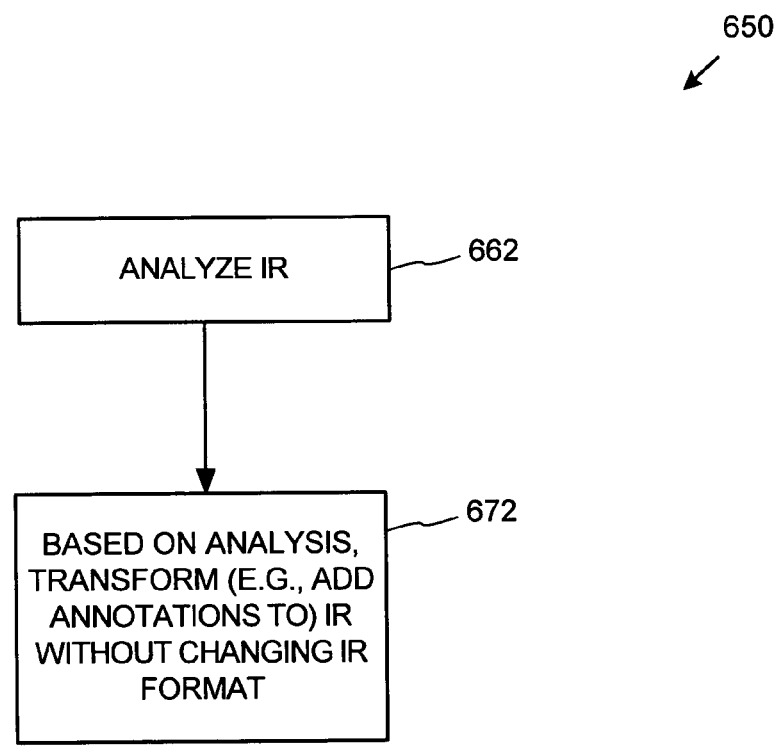

FIG. 6B is a flowchart of a method 650 for modifying annotations in an IR, such as the IR shown in any of the examples described herein.

At 662, the IR is analyzed. Again, for example, a software development tool can traverse (e.g., "walk") any of the IR data structures. Then, based on the analysis, at 672, the IR is transformed (e.g., by a software development tool). Such transformation can include modification to annotations of the IR (e.g., by adding, changing or deleting annotations). Also, such modifications can be made without changing the IR format. In this way, the IR format can remain the same throughout the software development process.

EXAMPLE 16

Exemplary Annotations for the IR

The IR format can support annotations in a variety of ways. For example, additional information can be associated with an instruction or operand node. Such information can take the form of values, pointers to nodes, or the like.

Figure 7A:
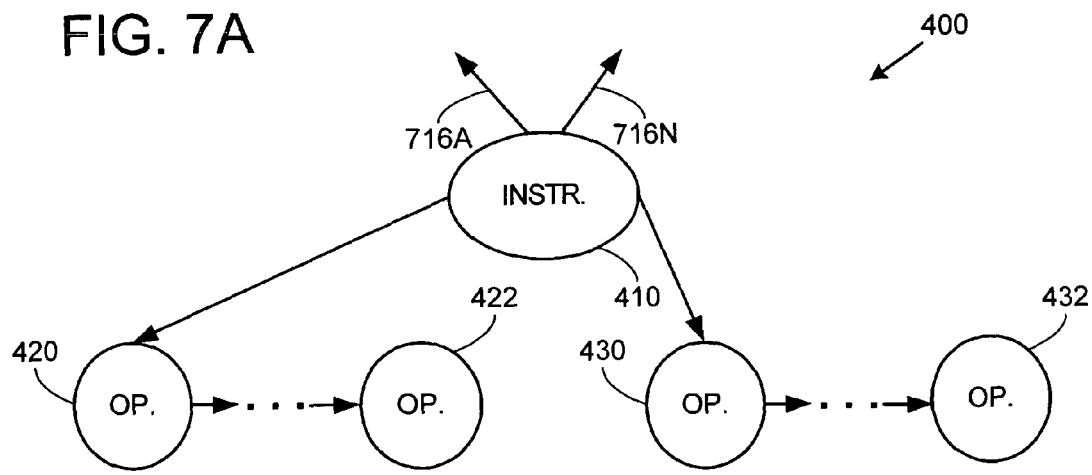
FIGS. 7A and 7B are block diagrams showing exemplary arrangements for annotating an intermediate representation of software.

FIG. 7A shows an exemplary arrangement for annotating an intermediate representation of software (e.g., without changing the format of the IR). In the example, one or more pointers 716 are added to the instruction node 410 (e.g., of FIG. 4). Such pointers can point to other instruction nodes, operand nodes, or another structure. Based on how or where the pointer is stored, it can take on a particular significance. However, the remainder of the data structure 400 need not change. The format of the IR can remain identical.

Figure 7B:
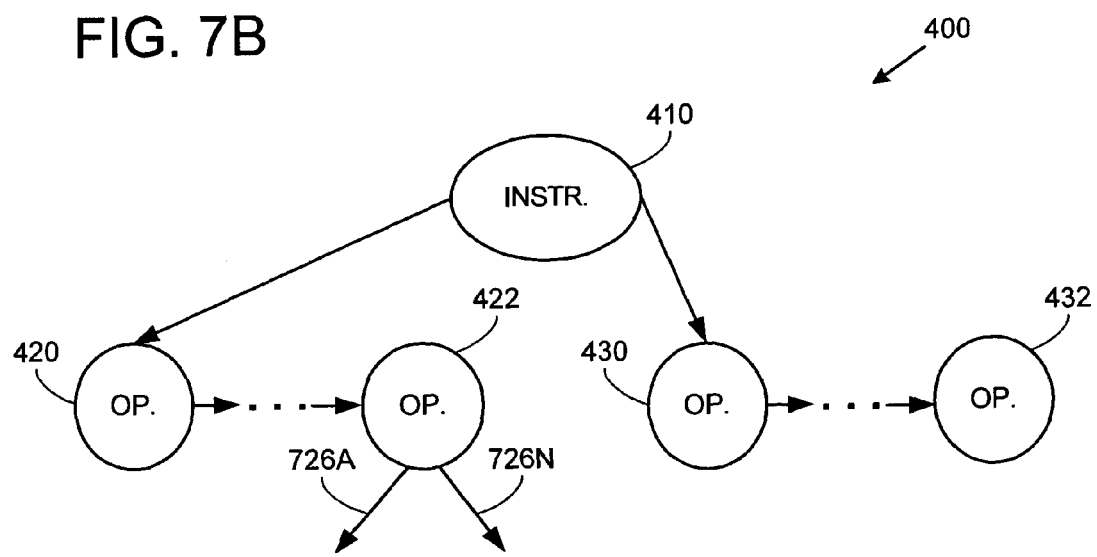

FIG. 7B shows another exemplary arrangement for annotating an intermediate representation of software (e.g., without changing the format of the IR). In the example, one or more pointers 726 are added to the operand node 422 (e.g., of FIG. 4). Such pointers can point to other operand nodes, instruction nodes, or another structure. Based on how or where the pointer is stored, it can take on a particular significance. However, the remainder of the data structure 400 need not change. The format of the IR can remain identical.

Other examples (not shown) include simply storing a value in a node. Again, based on how or where the value is stored, it can take on a particular significance.

EXAMPLE 17

Exemplary Auxiliary Data Structures

During the software development process, various software development tools may perform a variety of analyses on the software being developed. For example, data flow and control flow graphs may be generated to determine how to best compile or transform the software.

In any of the examples described herein, such auxiliary data structures can be implemented via the IR format by annotating the IR without having to construct a separate data structure. Separate data structures may be desired in some instances, but are not necessary to explicitly represent many auxiliary data structures. For example, a graph can be threaded through nodes of the IR rather than creating a separate data structure.

EXAMPLE 18

Explicitly Representing Data Flow in the IR

Data flow for the software represented via the IR format can be explicit in the instruction stream. For example, in the case of any uses of a resource (e.g., a variable, register, memory location, or the like), a pointer to the definition of the resource can be stored and vice-versa. In this way, various analyses relating to data flow (e.g., explicitly storing def-use information and constructing Static Single-Assignment "SSA" form) can be performed without having to create separate data structures.

Figure 8:
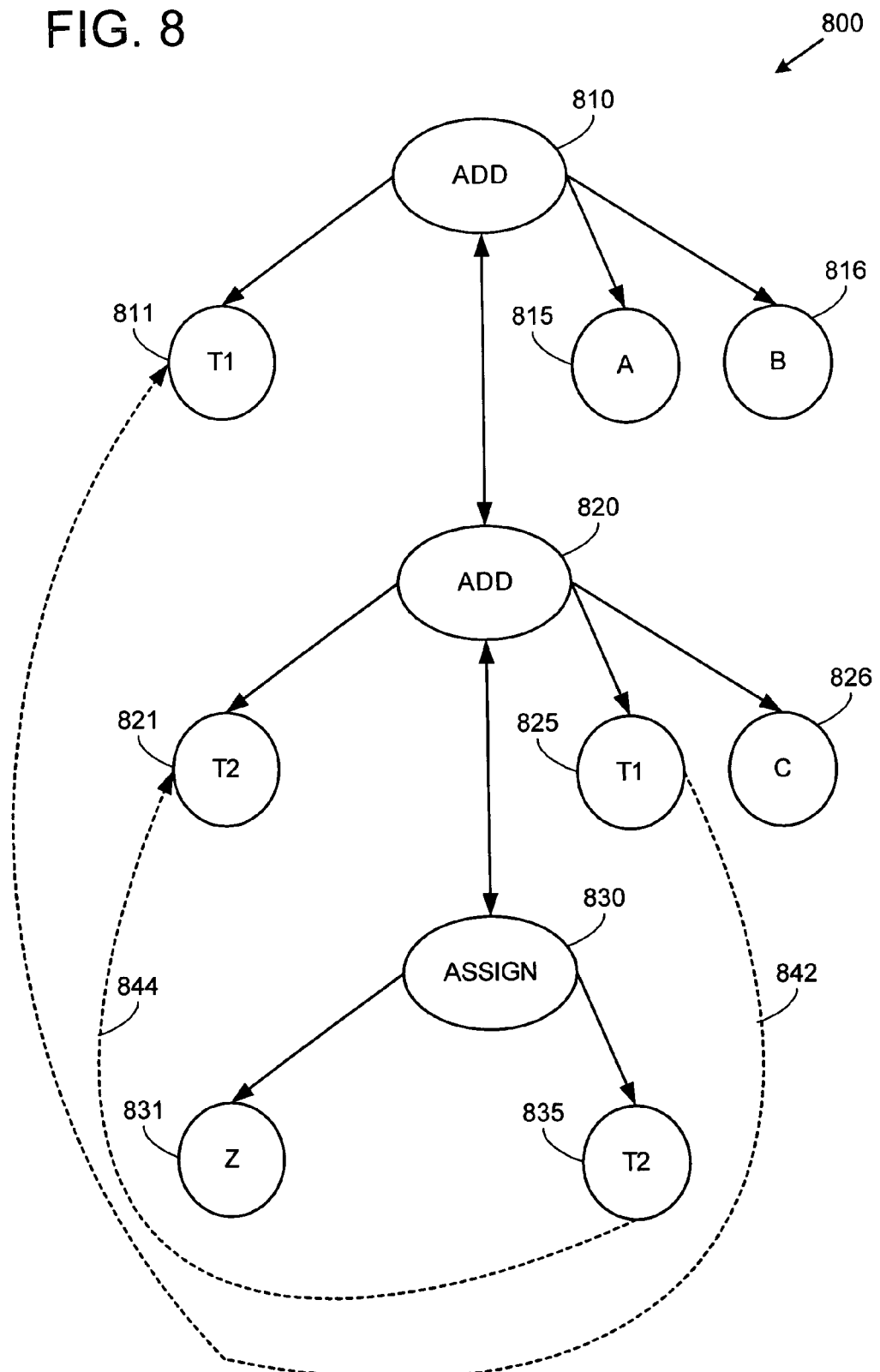
FIG. 8 is a block diagram showing an exemplary arrangement for explicitly representing data flow in an intermediate representation of software.

FIG. 8 shows an exemplary arrangement for explicitly expressing data flow in an intermediate representation 800 of software. The software represented is a high-level representation of that shown in Table (1).

In the example, the instruction nodes 810, 820, and 830, along with the operands 811, 815, 816, 821, 825, 826, 831, and 835 represent the software at a high (e.g., machine-independent) level. However, data flow can also be explicitly expressed at lower levels.

To expressly represent data flow, an association (e.g., link) from any "uses" of a variable (or other storage location) is made to any "defs" of the variable. In other words, a reference to a variable as a source operand is linked to the corresponding destination operand(s). In the example, a link is made from the use of T1 at the source operand 825 to the definition of T1 at the destination operand 811. Similarly, a link is made from the use of T2 at the source operand 835 to the definition of T2 at the destination operand 821. In the example, a one-way link is found, but in practice, the link may also go the other way or in both directions.

In some cases, there may be more than one possible definition (e.g., due to branching statements). In such a case, appropriate phi ("φ") nodes can be added.

As shown in the example, data flow can be explicitly represented and expressed in the intermediate representation without modifying the format of the IR. Instead, the data flow is threaded through the IR. Other types of annotations can be combined with the ones shown as desired.

EXAMPLE 19

Explicitly Representing Control Flow in the IR

Control flow for the software represented via the IR format can be explicit in the instruction stream. For example, in the case of branches, pointers to the possible execution paths can be stored in the IR. To fully explicitly represent control flow, labels for fall through cases can also be included in the IR.

Figure 9:
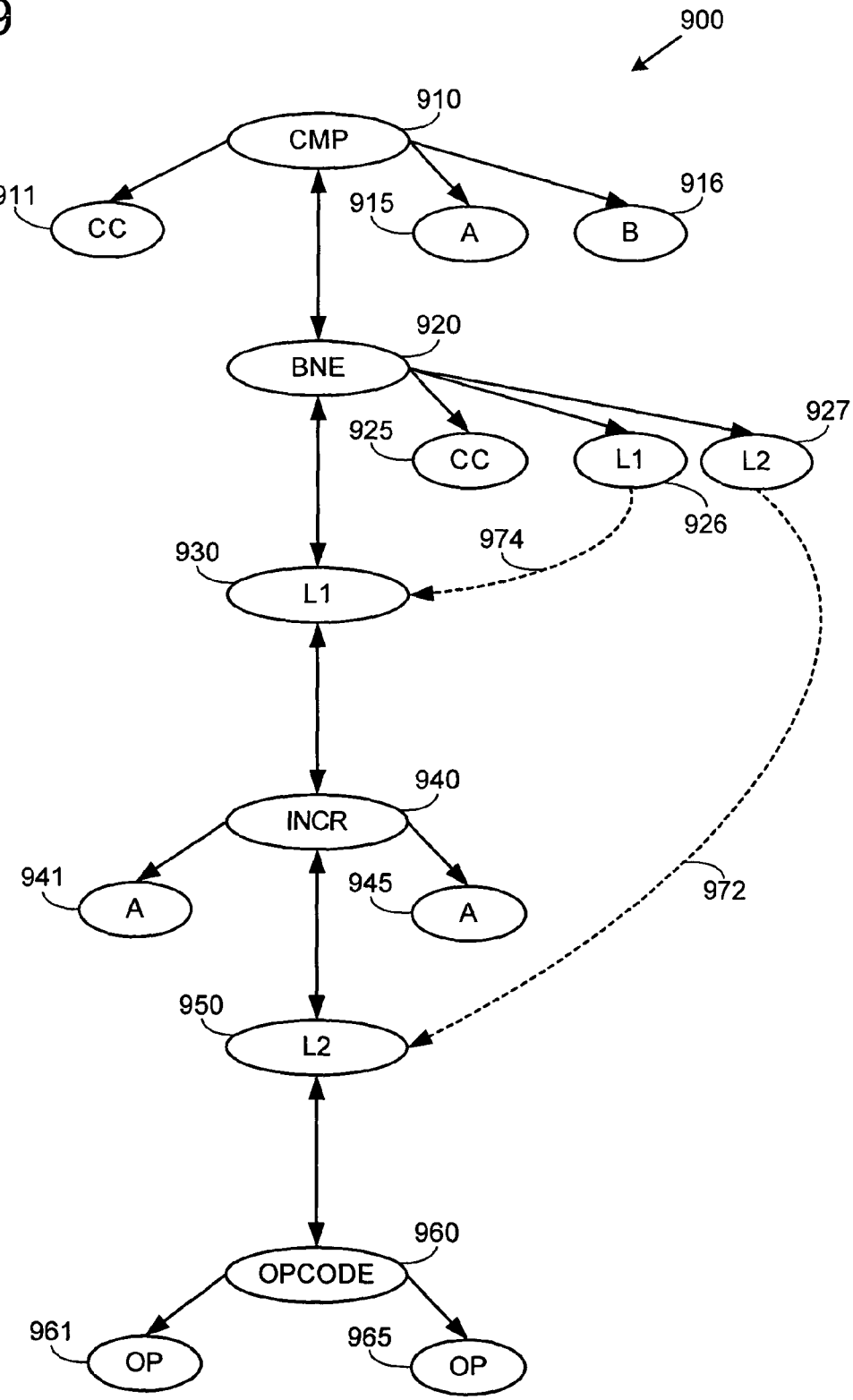
FIG. 9 is a block diagram showing an exemplary arrangement for explicitly representing control flow in an intermediate representation of software.

FIG. 9 shows an exemplary arrangement for explicitly representing control flow in an intermediate representation of software. The representation 900 represents the software statement "if (a!=b) a++;"

In the exemplary representation 900, the instruction nodes 910, 920, 930, 940, and 950 and associated operand nodes 911, 915, 916, 925, 926, 927, 935, 941, 945, and 955 represent the software. The instruction node 960 and associated operands 961 and 965 are shown for purposes of illustration only.

To expressly represent control flow, links are made from branches in the software to destinations of the branch. For example, a link is made from the possible branch of the BNE instruction 920 from the operand 926 to the corresponding label 935 of the related label instruction 930 (e.g., the "TRUE" case). Another link is made from the possible branch of the BNE instruction 920 from the operand 927 to the corresponding label 955 (e.g., the "FALSE" case). In the example as in any of the examples herein, a label can be created for both cases.

Although the example shows a one-way link, the link can go the other way or both ways. Further, if more than one path to a label is possible, multiple links can be represented. "DO," "WHILE," "FOR," and other looping structures can also be so represented.

As shown in the example, control flow can be explicitly represented and expressed in the intermediate representation without modifying the format of the IR. Instead, the control flow is threaded through the IR. Other types of annotations can be combined with the ones shown as desired.

Further, although the example shows a low level representation of the software, the control flow can also be so represented at higher levels. In fact, one of the many possible advantages of threading the control flow through the IR rather than separately representing it is that whenever the IR is updated, the control flow can also be updated at the same time by performing operations on the same data structures. Thus, the problem of having a separate representation that no longer accurately represents the control flow of a modified IR is avoided.

Appendix B shows a more complete example with dumps of the IR for various phases for a function "foo (int a, int b, int c)" incorporating the above code.

EXAMPLE 20

Explicitly Representing Exception Handling Control Flow in the IR

Although not shown in the example, control flow related to exception handling can also be explicitly represented via the IR format. For example, execution of an instruction may result in an exception, which causes control to flow to an exception handler or some other software. By explicitly representing the exception handling with an exception handling model that can accommodate a variety of exception handling models, the IR format can serve as a general-purpose IR format for software written to any of the models.

EXAMPLE 21

Exemplary Type Information in the IR

Figure 10A:
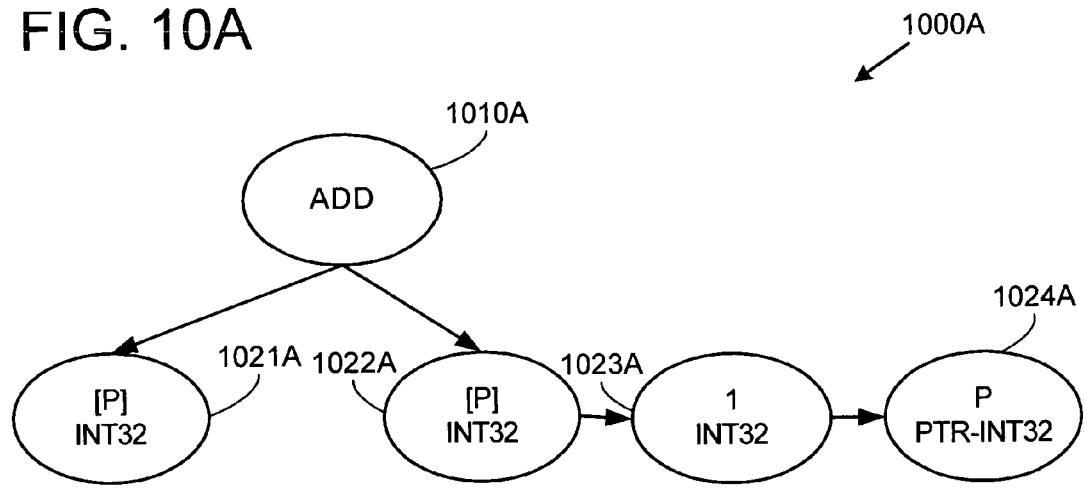
FIGS. 10A and 10B are block diagrams showing exemplary lowering of the IR while preserving type information.
Figure 10B:
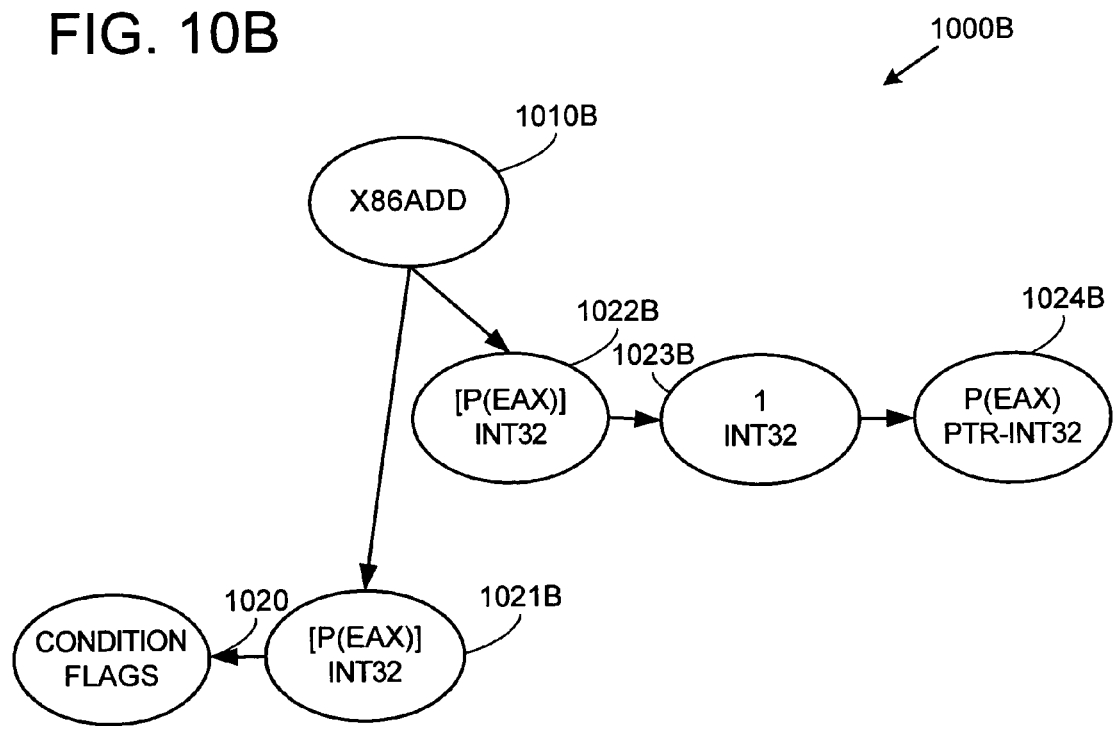

In addition to the information shown in any of the examples herein, type information (e.g., type information for operands of the IR) can be stored in the IR via the IR format. Further, such type information can be preserved (e.g., explicitly represented) when the IR is lowered. For example, in the lowest form of the IR, the type information can still be stored. FIGS. 10A and 10B show an exemplary lowering of the IR while preserving type information.

FIG. 10A shows a high-level intermediate representation 1000A of the statement "*p=*p+1" . In the example, type information (e.g., from the source code) is stored in the corresponding operand nodes (e.g., p is a pointer to a 32-bit integer) 1021A, 1022A, 1023A, and 1024A.

Subsequently, when the representation 1000A is lowered, it may appear as shown in the exemplary low-level intermediate representation 1000B shown in FIG. 10B. In the example, the type information (e.g., from the source code) is preserved and explicitly represented in the operand nodes 1021B, 1022B, 1023B, and 1024B. For the sake of simplifying the illustration, a single node 1020 is shown for the processor flags (e.g., OF, SF, ZF, AF, CF, PF). In practice, a single node or multiple nodes can be used.

Such an arrangement can have a variety of advantages, such as assisting in the construction of managed code (e.g., code that supports automatic garbage collection). For example, it may be desirable to determine whether an operand is of a type that is to be managed in a managed code scenario.

EXAMPLE 22

Alias Information in the IR

Additionally, in any of the examples herein, alias information can be stored in the IR via the IR format. Alias information can indicate other ways a particular variable or other storage location might be referenced. For example, a variable x might be altered by references to x, but it might also be altered by using a pointer to x.

An alias tag can be associated with an operand. Consultation of the tag reveals the set of aliases for the operand. The alias information can be stored in the IR without modifying its format (e.g., via an annotation).

EXAMPLE 23

Exemplary Operand Kinds

Although operands may represent actual operands (e.g., variable, memory locations, and the like), they can also represent pseudo operands, such as labels and the like. Additional exemplary operands are described in the exemplary comprehensive implementation below.

EXAMPLE 24

Exemplary Instruction Kinds

Although instruction nodes may represent actual instructions (e.g., source, IL, or machine opcodes), they can also represent data, pseudo instructions, and the like. For example, a pseudo instruction can serve as a label in an instruction stream, and pragmas can be represented by a pseudo instruction. Data represented by data instructions can include non-instruction data or representations of actual instructions (e.g., sequences of actual instructions). Additional exemplary instructions representable by instruction nodes are described in the exemplary comprehensive implementation below.

EXAMPLE 25

Exemplary Comprehensive Implementation of IR

Any permutation of the various technologies described herein can be combined to implement a general-purposed intermediate representation for software development tools. The following exemplary implementation includes operands, instructions, , data structures, and other items appropriate for the IR, but many other arrangements are possible.

Operands

Figure 11:
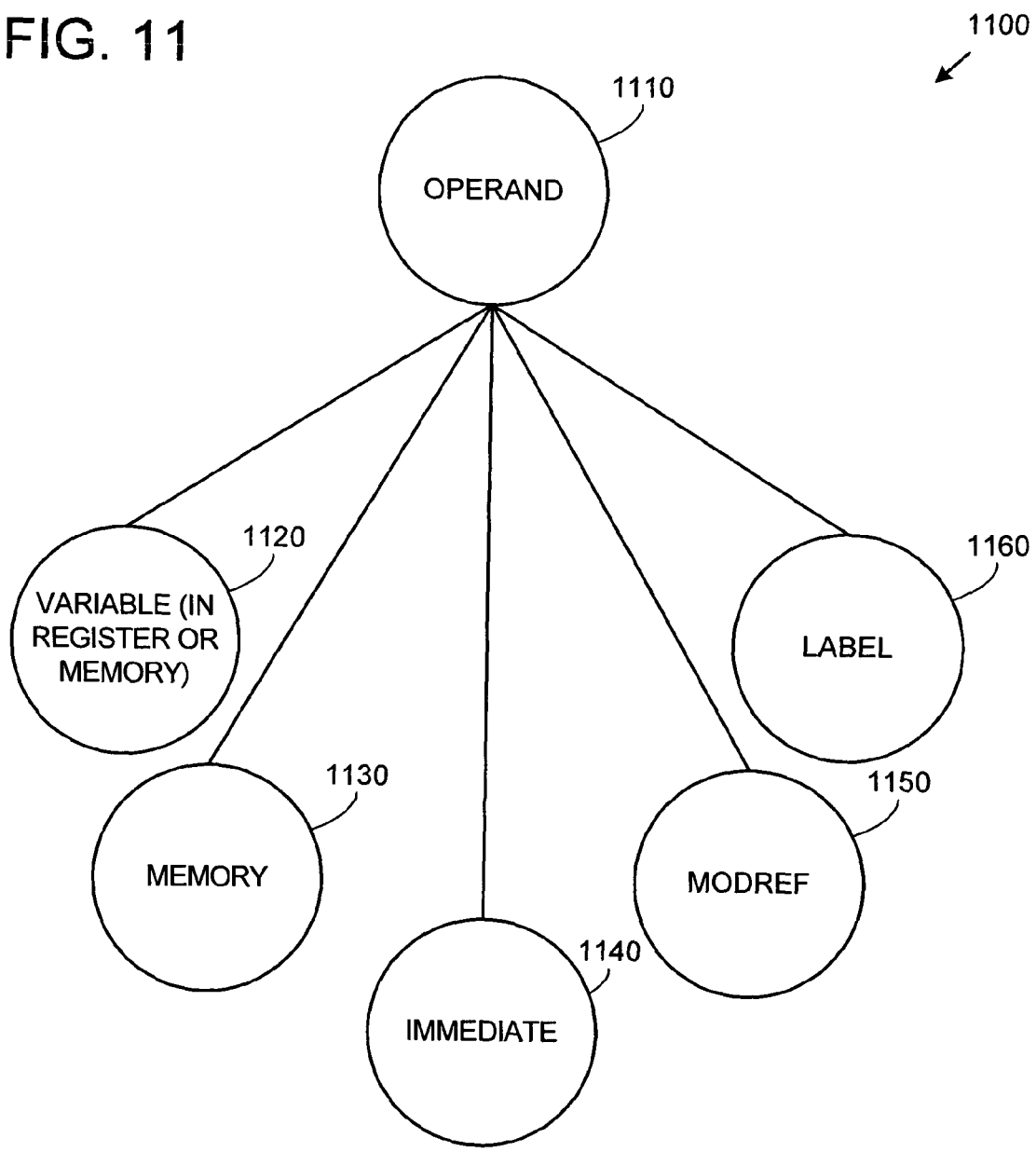
FIG. 11 is a block diagram showing relationships between exemplary operand kinds.

FIG. 11 shows an exemplary hierarchy 1100 (e.g., for use in a class hierarchy) for operand types. The operand hierarchy represents the variables, memory references, immediates (constants) and modref (modify/reference) side-effects used by an instruction. The operands are flexible enough to describe source level concepts like variables down to machine level concepts like registers and address modes. Other hierarchies, or a flat arrangement (e.g., no hierarchy) can be used.

The base class operand 1110 can be an abstract class. VarOpnds 1120 can represent a user variable or compiler temporary in a register or in memory. In addition, VarOpnds can be marked with an attribute that denotes whether they indicate the address or the contents of the variable.

MemOpnds 1130 refer to the address or content of memory locations. It is the operand used for denoting memory indirections or calculating effective addresses depending on the access attribute. It can be capable of expressing the most powerful address mode on any target machine.

ImmOpnds 1140 represent integer, floating point, string, or other constants referenced by the instruction stream.

ModRefOpnds 1150 interact with the Alias package and are used to describe may-use or may-def information which are side-effects of a particular instruction. A common usage is for ModRefOpnds to specify register kill sets and global variable ref/def information for function calls.

LabelOpnds 1160 can be used to indicate a label within software (e.g., for branching or looping statements).

Instructions

Figure 12:
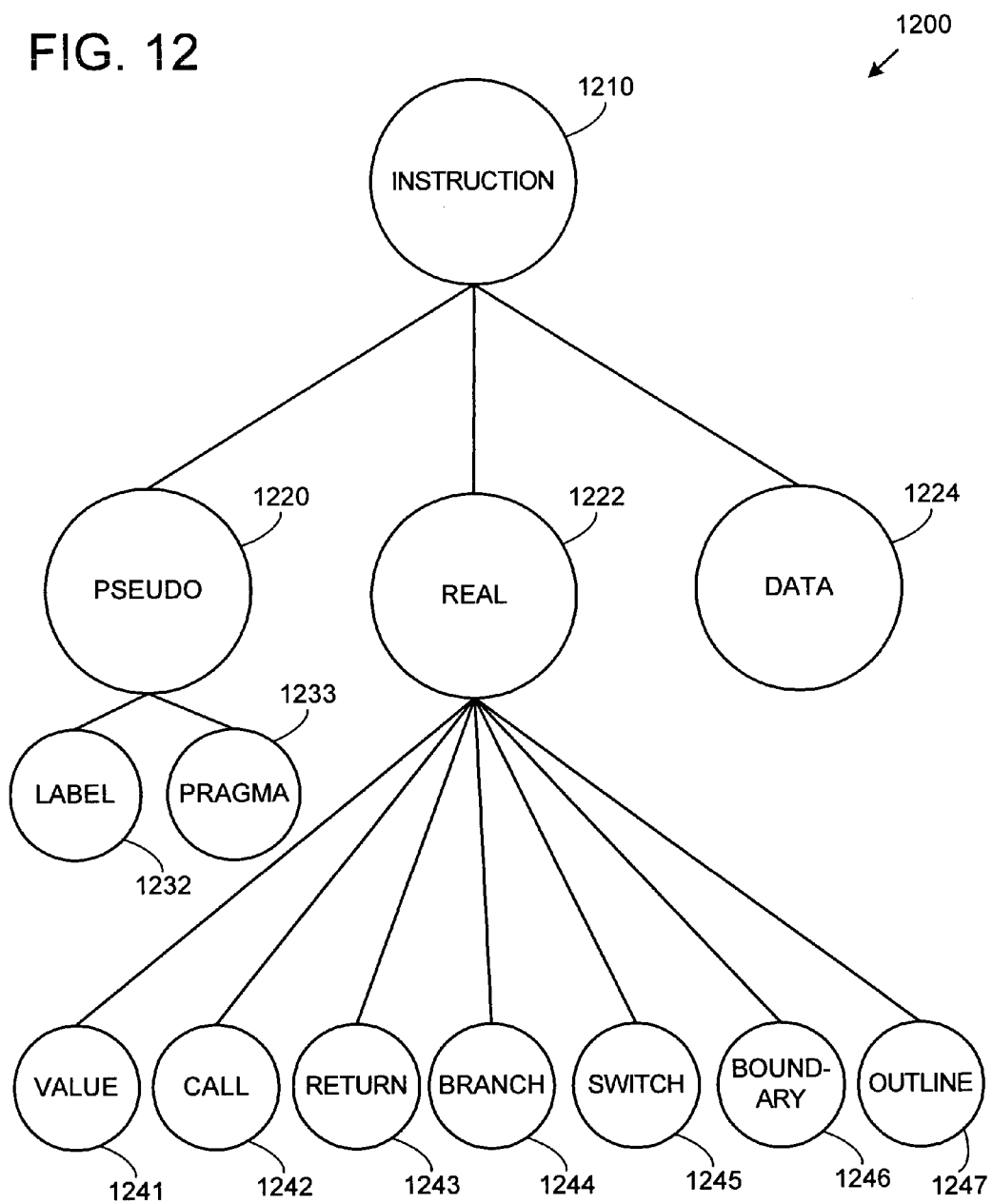
FIG. 12 is a block diagram showing relationships between exemplary instruction kinds.

FIG. 12 shows an instruction hierarchy 1200 (e.g., for use in a class hierarchy) for instructions. The base class instruction 1210 can be an abstract class. Although a particular hierarchy is shown, a different hierarchy or a flat arrangement (e.g., no hierarchy) can be used.

The instruction hierarchy is broken down into real instructions 1222 (instructions that have dataflow), pseudo instructions 1220 (labels 1232 and pragmas 1233) and data 1224 (allocated or embedded data). The most basic form of instruction is a ValueInstr 1241. A ValueInstr 1241 can represent any arithmetic or logical operation that produces a value. CallInstr/ReturnInstr 1242/1243 can be used for procedure invocation.

BranchInstr/SwitchInstr/LabelInstr 1244/1245/1232 can be used for intra-procedural control flow. BoundaryInstr/OutlineInstr 1246/1247 can be used to define regions in the IR such as procedure entry/exit and inline assembly blocks of code respectively.

Associated Data Structures

The IR defines the code and data of a function but need not stand in isolation. It can reference other data structures of the framework to completely describe operations, control flow and dataflow. In addition, other structures can be layered on top of the IR for doing higher level forms of analysis (e.g., flow graphs, region graphs, ASTs). The relationship between the IR and these key data structures can be described as follows.

ID

The operands in the IR frequently refer to Ids. There are local Ids which enumerate resources (symbols, temporaries, registers) on a per function basis. The enumeration is unique to a function, and the same global symbol may be given different local Ids in different functions (via a proxy symbol). Ids are generally used for analyzing dataflow information, but can be used to associate other information as well. Thus, per function enumeration can be advantageous.

Symbols & Symbol Tables

The operands in the IR can reference user variables and resources via symbols defined in either the local or global symbol tables. When specifying a variable's value/address, jumping to a user defined label, or making a direct call to a function, symbols can be used.

Types & Typesystem

The operands in the IR can be strongly typed. Therefore, there are references from the IR operands to the types system via a Type property. The type system is usually a global mechanism but can be configured per module or per function as desired.

Fields

Fields are an abstraction used to reference either partial or complete resources. They are very useful to reference instance members of a class or sub registers. In order to unify the reference mechanism, operands that reference resources also supply field information. The notion of "primary field" is used to reference a complete object. Any other field could represent any portion of a resource. Field resides in the type system since they can represent a subdivision of a particular type. Fields are uniquely defined by (Type, Offset). Fields can represent any resource in whole or part, including bit fields.

Units

Units are units of compilation or analysis and provide for hierarchy and a way to subdivide a program. The most common Unit is the FuncUnit which represents a single function or method. It is the container for the IR that represents the stream of code for the function. There is an analog for data as well called a DataUnit. DataUnits contain streams comprised purely of DataInstrs. Having both code and data represented by streams of "instructions" contained by the appropriate kind of Unit unifies the notions of code and data streams and simplifies the design of code and data layout and manipulation tools. Other interesting Units are Global, Program, Module, and Assembly.

Flow Graph

While the IR explicitly represents the control flow (e.g., all control flow) in a function, many algorithms want a traditional flow graph that summarizes information on a basic block or extended block level. A flow graph can be built on top of the IR and linked such that nodes (e.g., all nodes) in the flow graph have a label associated with them in the IR and edges (e.g., all edges) in the flow graph have an IR edge associated with them. The flow graph is optional and can be built/rebuilt on demand.

Region Graph

Another data structure that can be superimposed on top of the IR is a region graph. These may be used to describe loops, exception handling regions, optimization regions, inline regions or other lexical and non-lexical regions. As with the flow graph, the region graph is optional and built/rebuilt on demand.

SSA Graph

SSA or Single Static Assignment form is a technique for representing dataflow. It guarantees that each use of a resource is reached by one and only one definition of that resource. To handle multiple reaching definitions, pseudo operations called PHI instructions are introduced to merge multiple definitions into a single definition. The IR supports SSA directly by having a PHI instruction and wiring the UD/DU chains directly through the operands in the IR graph. A side table can be used to reference SSA variables and definitions.

Abstract Syntax Trees

Abstract syntax trees are supported by the IR using the regions to denote the syntax and lexical constructs from a source point of view. Powerful backmapping mechanisms are used to associate IR with source line/column information.

Constant Tables

Constant operands reference side tables that manage constants of various types.

IR Elements

This section describes the various elements of the IR and their uses. The IR elements can be nodes that are composed into a graph that fully describes the operations, dataflow and control flow through a function. The elements include: operands, real instructions, pseudo instructions and data instructions.

Operands

Operands are the leaf nodes of the IR graph. Operands appear on the source and destination lists of an instruction. Side-effects (e.g., all side-effects) are explicit on the instructions; so there are operands to depict actual or potential resource usage (e.g., all actual or potential resource usage) including immediates, register, memory, and condition codes. Leaf nodes (e.g., each leaf node) have a type associated with them denoting their abstract type, which in turn maps to a machine type on lowered instructions.

A unique instruction reference (e.g., each unique instruction reference) of a resource is represented as a unique copy of that operand, the instructions source list, and the destination list. Thus, operands can be connected into dataflow graphs such as SSA, def-use/use-def chains, and expression trees without side data structures. The unique copy invariant is maintained by the framework.

Operands (e.g., all operands) have some basic properties. Some are used to manage operand lists, others are common attributes that can be compactly encoded on the operand. Not all properties apply to all operands. Where certain operands are not appropriate, a suitable default value is returned. Exemplary properties are shown in Table (2). In any of the examples, additional or fewer properties can be supported for an operand.

TABLE 2

Table of Operand Properties

| Property | Description |
|---|---|
| Type | Type of operand (if any) |
| PrimType | PrimType of operand (if any) |
| Field | Field of operand (if any) |
| Sym | Sym associated (if any) |
| ByteSize | Size of operand in bytes |
| BitSize | Size of operand in bits |
| IsInt | Is this an integer operand? |
| IsFloat | Is this a floating point operand? |
| IsPtr | Is this a pointer operand? |
| IsSignedInt | Is this a signed integer operand? |
| IsUnsignedInt | Is this an unsigned integer operand? |
| IsAggregate | Is this an aggregate (struct or class) operand? |
| InUse | Is operand currently in use (attached to instruction) |
| Instr | Instruction that operand is attached to |
| Func | Function of instruction |
| IsDef | Is this operand a def (on instruction destination list) |
| IsUse | Is this operand a use (on instruction source list) |
| IsExplicit | Is explicit operand, used directly by an instruction |
| IsImplicit | Is implicit operand, used to record side-effects of an instruction |
| IsAddrModeReg | Is address mode register (referenced by MemOpnd) |
| IsVolatile | Is this a volatile reference |
| IsExprTmp | Is this an expression temporary (single-def/single-use) |
| CantMakeExprTmp | This temporary cannot be turned into an expression tmp |

VarOpnd

The Varopnd is used to reference resources like user variables, compiler temporaries, or physical registers. A VarOpnd can reference either the content or address of a resource. A reference can be to either the complete resource or portion of the resource based on the field information provided. Some examples of VarOpnd are listed Table (3).

TABLE 3

Exemplary Uses of Variable Operands

Resources:

int a;
struct S { int x, int y; int bf:3; } s;
register EAX { AX, AH, AL };
Example of VarOpnds uses:

| = a | // variable local/global reference |
| = EAX | // register reference |
| = AH | // sub register reference |
| = s | // struct local/global reference |
| = s.x | // member local/global reference |
| = s.bf | // bit field local/global reference |
| = &a | // address of local/global variable |
| = &s.x | // address of local/global member |

VarOpnds are the most flexible operands in the IR and can be used to reference a variety of resources in many ways as noted previously. Table (4) lists properties for the VarOpnd that can be used to determine what kind of reference the VarOpnd is.

TABLE 4

Exemplary Variable Operand Properties

| Property | Description |
|---|---|
| Id | Symbol, Tmp or Register Id |
| Type | Type of reference |
| Sym | Symbol associated with resource (if any) |
| Reg | Register assigned to resource (if any) |
| Field | Portion of resource being referenced (defined by: Type, Size, Offset) |
| AliasTag | AliasTag for dataflow (defined by: Id, Type, Offset) |
| IsReg | Is this a register reference |
| IsMem | Is this a memory reference |
| IsAddr | Is this a address reference |
| IsTmp | Is this a compiler temporary |

In order for a VarOpnd to be designated as being in memory, it has a symbol associated with it. In order for a VarOpnd to be designated as a register, it has a virtual or physical register associated with it. In the case of compiler/tool generated temporaries, if neither a register nor symbol is associated with it, it is uncommitted. During HIR processing, tools need not be concerned with whether a temporary is in register or memory. However, post-lower, temporaries (e.g., all temporaries) can be assigned a symbol or register.

Allowing for VarOpnd to express both value of symbol and address of symbol simplifies AST/HIR/MIR usage. It is trivial to convert between value-of/address-of by toggling the property.

Table (5) shows properties and availability/value based on type of resource reference.

TABLE 5

Property Availability by Resource Reference Type

| Resource Ref | AliasTag | Id | Sym | Reg | IsReg | IsMem | IsAddr |
|---|---|---|---|---|---|---|---|
| Reg | Yes | Yes | No | Yes | Yes | No | No |
| Tmp | Yes | Yes | No | No | No | No | No |
| Sym (Reg) | Yes | Yes | Yes | Yes | Yes | No | No |
| Tmp (Reg) | Yes | Yes | No | Yes | Yes | No | No |
| Sym (Mem) | Yes | Yes | Yes | No | No | Yes | No |
| Tmp (Mem) | Yes | Yes | No | No | No | Yes | No |
| &Sym (Addr) | No | Yes | Yes | No | No | No | Yes |
| &Tmp (Addr) | No | Yes | Yes | No | No | No | Yes |

MemOpnd

MemOpnds are used to reference resources in memory either by name or indirection. A MemOpnd can reference either the content or address of a resource in memory. A reference can be to either the complete resource or portion of the resource based on the field information provided. Some examples of MemOpnds are listed in Table (6).

TABLE 6

Exemplary Uses of Memory Operands

Resources:

int a[ ];
struct S { int x, int y; int bf:3; } s;
struct S *p;
Example of MemOpnds uses:

```
= *p           // indirect reference
= a[i]         // array reference
= s            // struct global reference
= s.x          // member global
= &a[i]        // array effective address
= &s           // struct effective address
= s.x          // member effective address
= &s.bf        // address of bitfield illegal
```

MemOpnds are capable of expressing the most complex addressing mode available on the target machine. However, during HIR processing, MemOpnds are restricted to simple indirection off a single base pointer (no offset, no index, no scale). This simplifies the overall design of the machine independent optimizers. Table (7) lists the most frequently used properties on the MemOpnd.

TABLE 7

Exemplary Properties of Memory Operands

| Property | Description |
|---|---|
| Type | Type of reference |
| Field | Portion of resource being referenced (defined by: Type, Size, Offset) |
| AliasTag | AliasTag for dataflow (defined by: Address, Type, Offset) |
| Sym | Symbol specifying symbolic portion of address calculation |
| BaseOpnd | Operand (register) specifying base address added to address calculation |
| IndexOpnd | Operand (register) specifying index added to address calculation |
| Scale | Scale factor for index: 1, 2, 4, or 8 |
| ByteOffset | Byte offset added to address calculation |
| Shifter | Shifter address calculation control |
| BaseUpdate | Update mode for base address operand |
| Align | Alignment |
| IsMem | Is this a memory reference |
| IsAddr | Is this a address reference |

Memopnds represent either the contents or the address of the resource being referenced. MemOpnds are capable of expressing the most complex addressing mode of any target machine the framework supports. The actual implementation can be optimized to make the most common form "sym[reg]offset" the most efficient to represent.

Table (8) shows exemplary properties and availability/value based on type of resource reference and the kind of address calculation being used.

TABLE 8

Property Availability by Resource Reference Type

| Resource Ref | Alias-Tag | Sym | Base Opnd | Index Opnd | Byte Offset | Is-Mem | Is-Addr |
|---|---|---|---|---|---|---|---|
| [Reg] | Yes | No | Yes | No | No | Yes | No |
| [Reg]Offset | Yes | No | Yes | No | Yes | Yes | No |
| [Reg,Reg] | Yes | No | Yes | Yes | No | Yes | No |
| [Reg,Reg]Offset | Yes | No | Yes | Yes | Yes | Yes | No |
| Sym[Reg] | Yes | Yes | Yes | No | No | Yes | No |
| Sym[Reg]Offset | Yes | Yes | Yes | No | Yes | Yes | No |
| Sym[Reg,Reg] | Yes | Yes | Yes | Yes | No | Yes | No |
| Sym[Reg,Reg]Offset | Yes | Yes | Yes | Yes | Yes | Yes | No |
| Sym[Reg * Scale] | Yes | Yes | No | Yes | No | Yes | No |

TABLE 8-continued

Property Availability by Resource Reference Type

| Resource Ref | Alias-Tag | Sym | Base Opnd | Index Opnd | Byte Offset | Is-Mem | Is-Addr |
|---|---|---|---|---|---|---|---|
| &[Reg] | Yes | No | Yes | No | No | No | Yes |
| &[Reg]Offset | Yes | No | Yes | No | Yes | No | Yes |
| &[Reg,Reg] | Yes | No | Yes | Yes | No | No | Yes |
| &[Reg,Reg]Offset | Yes | No | Yes | Yes | Yes | No | Yes |
| &Sym[Reg] | Yes | Yes | Yes | No | No | No | Yes |
| &Sym[Reg]Offset | Yes | Yes | Yes | No | Yes | No | Yes |
| &Sym[Reg,Reg] | Yes | Yes | Yes | Yes | No | No | Yes |
| &Sym[Reg,Reg]Offset | Yes | Yes | Yes | Yes | Yes | No | Yes |
| &Sym[Reg * Scale] | Yes | Yes | No | Yes | No | No | Yes |

ImmOpnd

The ImmOpnd is used to reference constants such as integer constants, floating point constants, pointer constants, and symbolic constants (e.g., FRAMESIZE). ImmOpnds logically represent immediate operands of HIR instructions. The actual representation on a target machine in expressed LIR may be different. For example, x86 doesn't support immediate floating point constants, so they are implemented in a static data table.

TABLE 9

Exemplary Uses of Immediate Operands

Example of ImmOpnds uses:

= 0x7fff                    // unsigned integer constant
= −1          // signed integer constant
= 2.0                       // floating point constant
= FRAMESIZE   // symbolic constant
= "Hello World"   // string constant ImmOpnds are general enough to represent any immediate or constant value that can be expressed in the framework. ImmOpnds are kept very small and interface to a constant package that hashes/coalesces actual constant values.

Table (10) lists properties for the ImmOpnd.

TABLE 10

Exemplary Properties of Immediate Operands

| Property | Description |
|---|---|
| Id | Constant id for constant table |
| Type | Type of reference |
| Sym | Symbol (if symbolic constant) |
| IntVal | Get Signed Integer value (if IsInt = = true) |
| IntVal8 | Get 8-bit Signed Integer value (if IsInt = = true) |
| IntVal16 | Get 16-bit Signed Integer value (if IsInt = = true) |
| IntVal32 | Get 32-bit Signed Integer value (if IsInt = = true) |
| IntVal64 | Get 64-bit Signed Integer value (if IsInt = = true) |
| UIntVal | Get Unsigned Integer value (if IsInt = = true) |
| UIntVal8 | Get 8-bit Unsigned Integer value (if IsInt = = true) |
| UIntVal16 | Get 16-bit Unsigned Integer value (if IsInt = = true) |
| UIntVal32 | Get 32-bit unsigned Integer value (if IsInt = = true) |
| UIntVal64 | Get 64-bit Unsigned Integer value (if IsInt = = true) |
| FloatVal | Get Floating point value (if IsFloat = = true) |
| PtrVal | Get pointer value (if IsPtr = = true) |
| PtrVal32 | Get 32-bit pointer value (if IsPtr = = true) |
| PtrVal64 | Get 64-bit pointer value (if IsPtr = = true) |

Constant Representation

The representation can be optimized for size. The operand referenced by an instruction can contain only the Type and Id.

Constant Ids

The Id on an ImmOpnd can be used as an index into a constant table appropriate for the type of operand. There can be tables for integers values, floating point values, and pointer values.

Constant Table

A Constant Table can contain the actual representation of constants accessed via ConstantTable[ImmOpnd->Type, ImmOpnd->Id]. Entries can contain the data representing constant values. The constant table can be hashed and coalesced so that only one unique copy of a constant value exists.

ModRefOpnd

ModRefOpnds are used to represent "may" reference or modify information on instructions. These operands are tightly related to the Alias package and use AliasTags to summarize the resources being modified/referenced. These resources can be symbols, registers, or memory. Table (11) shows exemplary ModRef Properties

TABLE 11

Exemplary ModRef Properties

| Property | Description |
|---|---|
| AliasTag | AliasTag representing resources modified or referenced |

ModRefOpnds can be used to represent mod/ref resource sets on function calls and transformation inhibiting side-effects (e.g., due to the presence of of EH instructions).

Exemplary Instruction Categories

There can be three categories of instructions in the exemplary framework: real, pseudo and data. Real instructions can represent operations with dataflow and/or control flow, pseudo instructions can represent items such as labels and pragmas, and data instructions can represent data embedded in the code stream in a function or separate streams of allocated data for a static symbol.

An instruction can be implemented as an object (e.g., with properties and methods). A single object class or a class hierarchy can be used. Although exemplary properties are listed for the different types of instructions, additional or fewer properties can be used. The object can be defined so that it supports any combination of the listed or other properties.

Real Instructions

Real instructions can be those instructions capable of expressing an operation, dataflow, and/or control flow. This means they can have an opcode, a source operand list, and a destination operand list. This does not necessarily mean all real instructions translate to machine instructions, only that they are "real" from a data/control flow point-of-view.

The control flow can be explicit in the IR. This means real or potential (exception handling) control flow (e.g., all control flow) can be represented as edges in the IR graph. This in turn means that a real instruction (e.g., every real instruction) can have an optional property to connect the instruction to an appropriate exception handler. Table (12) shows exemplary properties for real instructions.

TABLE 12

Exemplary Properties for Real Instructions

| Property | Description |
| --- | --- |
| Opcode | Opcode of instruction |
| SrcList | List of source (input) operands |
| Src,Src1 | Source operand #1 |
| Src2..6 | Source operand #2..6 |
| DstList | List of destination (output) operands |
| Dst,Dst1 | Destination operand #1 |
| Dst2 | Destination operand #2 |
| Handler | Optional exception handling control edge |
| HasSideEffect | Instruction has side-effect |
| IsInstrinsic | Instruction represent intrinsic function call |

Real instructions can be broken down into different kinds of instructions based on their traits: simple, complex, control flow, and summary. The following sections list the various exemplary kinds of real instructions and their uses.

ValueInstr

The ValueInstr can be the simplest form of real instruction. ValueInstrs can be expression calculations that yield a value. This includes binary arithmetic operators such as Add, Sub, Mul, Div and logical operators such as BitAnd, BitOr, BitXor. It also includes unary operators like Assign and Neg. In its most general form, a ValueInstr can represent and any multi-input/multi-output calculation.

FORM: dst1, . . . <VALUE_OP>src1, src2, . . .

ValueInstr introduces no additional properties to the basic RealInstr properties.

CallInstr

The CallInstr instruction can represent either a direct or indirect function/method call. The first operand can be the target of the VarOpnd or MemOpnd representing the effective address of the target of the function call. The Type of the target can give information on the FuncType. The FuncType can be used to get the call signature (calling convention, return value type, argument types).

FORM: dst1, . . . =<CALL_OPCODE>target, arg1, arg2, . . .

CallInstr can introduce additional properties specific to function call processing as listed in Table (13).

TABLE 13

Exemplary Properties for Call Instructions

| Property | Description |
| --- | --- |
| FuncSym | Function being called (if IsDirect == true) |
| FuncType | Function type used to access function signature |
| RetType | Return value type |
| IsDirect | Is this a direct function call to a symbol |
| IsIndirect | Is this an indirect function call through a pointer |
| IsUnprototyped | Is this an unprototyped function call site |
| CallTargetOpnd | Operand representing target of call |

ReturnInstr

ReturnInstrs can be used to implement function returns. They can take an optional source operand which can represent the return value for the function. The type of the operand can be based on the return type of the function type.

FORM: <RETURN_OPCODE>src

ReturnInstrs add no addition properties to the basic RealInstr properties.

CompareInstr

CompareInstrs can be used to implement the concept of comparisons that yield condition codes for controlling flow through the program. While some target machines may implement comparisons as modifying or producing a value in a general purpose register, the HIR notion of comparisons producing an abstract condition code type can be carried throughout most of the framework. This allows for conformity and standardization throughout the target independent portions of the framework.

FORM: dst.cc=<CMP_OPCODE>src1, src2

CompareInstrs can add additional properties for handling a condition code as shown in Table (14).

TABLE 14

Exemplary Properties for Compare Instructions

| Property | Description |
| --- | --- |
| CondCode | Condition code for comparison |

BranchInstr

BranchInstrs can be used to implement conditional or unconditional control flow within a function. The IR format can require that all basic blocks begin with a Label. This is what can form the complete graph for IR control flow. Because of this, conditional branches provide both a TrueLabel and a FalseLabel. In the exemplary IR format, the first source operand must be of type condition code. The direction of the branch is based on whether the first operand is true or false. For unconditional branches, no condition code source or FalseLabel is present.

FORM: <GOTO_OPCODE>Label

FORM: <CBRANCH_OPCODE>src.cc, TrueLabel, FalseLabel

BranchInstr can introduce properties to deal with condition codes and target labels as shown in Table (15).

TABLE 15

Exemplary Properties for Branch Instructions

| Property | Description |
| --- | --- |
| CondCode | Condition code for comparison |
| IsGoto | Is goto or unconditional branch |
| IsCBranch | Is conditional branch |
| TrueLabel | Target label for true condition or goto |
| FalseLabel | Target label for false condition |

SwitchInstr

SwitchInstrs can implement the standard concept of a switch statement in a language like C++. The case list can be a list of integer ranges with associated target labels. A default label can also be provided. SwitchInstr is generally an HIR concept which eventually gets lowered (usually very late) into a combination of jump tables or cascaded condition branches optimized to minimize comparisons.

FORM: <SWITCH_OPCODE>src.int DefaultLabel <case list>

SwitchInstr can introduce additional properties for dealing with default labels and case lists as shown in Table (16).

TABLE 16

Exemplary Properties for Switch Instructions

| Property | Description |
| --- | --- |
| CaseList | List of cases <low:high, label> |
| DefaultLabel | Default label |
| IsLargeInteger | Is switch based on large integer? |

BoundaryInstr

BoundaryInstr can represent the boundary of region of code and provide for a way of describing input and output parameters to that region of code. The most common example of a BoundaryInstr is function entry. On function entry, the parameters can be defined on the destination list. Other regions of code can be represented, such as a region of code that resulted from inline expansion of a function call.

FORM: dst1, dst2, . . . =<ENTER_OPCODE>
FORM: <EXIT_OPCODE>src1, src2, . . .

BoundaryInstr can add additional properties to identify region as shown in Table (17).

TABLE 17

Exemplary Properties for Boundary Instructions

| Property | Description |
| --- | --- |
| FuncSym | Function symbol for region being bounded |

OutlineInstr

OutlineInstrs can be used to "outline" a section of code and record its side-effect on summary source and destination operand lists. The outlined section of code can be retained as a list of instructions hanging off the OutlineInstr. A common example of the use of an OutlineInstr is blocks of _asm inline assembly code.

FORM: dst1, dst2, . . . =<OUTLINE_OPCODE>src1, src2, . . .

OutlineInstrs can add additional properties to deal with the list of instructions being outlined as shown in Table (18).

TABLE 18

Exemplary Properties for Outline Instructions

| Property | Description |
| --- | --- |
| InstrList | List of instructions being outlined |

Pseudo Instructions

Pseudo instructions can represent non-dataflow items in the code stream. These can include labels and pragmas. Labels can be used for control flow. Pragmas can carry arbitrary data through the code stream, such as directives to various phases of a compiler.

LabelInstr

LabelInstrs can represent user defined labels in the code stream as well as any and all control flow merge points. By exemplary convention, every basic block begins with a label. Even fall through control is specified using a label. From a label, it is possible to locate the control flow operations (e.g., all of them) that target that label via an IR edge list including: branches, switches, and exception causing instructions for EH handler labels.

FORM: Label: <edge list>

LabelInstrs can provide properties for processing control flow in the IR graph and identifying the label by name or offset as shown in Table (19).

TABLE 19

Exemplary Properties for Label Instructions

| Property | Description |
| --- | --- |
| Id | Label Id |
| LabelSym | Symbol associated with label (if any) |
| EdgeList | List of edges connecting branch instructions to this target label |
| ByteOffset | Offset of label within function |
| IsReachable | Is this label reachable? |
| ProfileCount | Profile count |
| Block | Flowgraph block associated label (if any) |

PragmaInstr

PragmaInstrs can be markers that can be placed in the code stream that may contain arbitrary user supplied directives and data. The can be extended via extension object to carry any kind of framework or tool specific information. Pragmas can be identified by a unique opcode similar to real instructions.

FORM: <PRAGMA_OPCODE> <auxiliary data>

Pragma instructions need not add any additional properties.

Data Instructions

DataInstrs can provide for a unification the notion of code and data streams, which are both represented by IR streams in the framework. DataInstrs can be used inside a FuncUnit IR stream to represent code based or an DataUnit IR stream to represent static allocated data.

DataInstr

DataInstr can contain information on associated symbols, size and offset of data, raw bytes of data, fixup information, alignment information, and debug information.

FORM: <size, offset, raw data, fixups, align, symbols>

DataInstr can provide properties for processing with the allocated data as shown in Table (20).

TABLE 20

Exemplary Properties for Data Instructions

| Property | Description |
| --- | --- |
| Symbols | List of symbols associated with data |
| ByteSize | Size of data in bytes |
| ByteOffset | Section relative offset in bytes |
| Align | Alignment control |
| FixupList | List of fixups applied to data |
| DebugOffsets | Debug offsets |
| IsBss | Is this zero init data? |

EXAMPLE 26

Exemplary Annotations via IR Format

Table (21) shows exemplary source code that can be represented in an IR format and annotated without changing the format. Appendix C shows a dump of a high-level, machine-independent intermediate representation including explicit wiring of control flow for branches and blocks (shown in bold).

Appendix D shows a dump of a high level, machine-independent intermediate representation including explicit wiring of an SSA graph using definition numbers shown in bold.

TABLE 21

Exemplary Source Code

```
int foo(int a, int b)
{
    int r;
    if(a < b)
    {
        r=a + 1;
    }
    else
    {
        r=b + 1;
    }
    return r;
}
```

EXAMPLE 27

Exemplary Phases

Appendix E shows exemplary source code that can be converted into an intermediate representation having a format as described in any of the examples. The intermediate representation can then be run through a number of phases during the lowering process.

Appendix F shows exemplary contents of an intermediate representation after various exemplary phases. The intermediate representation can keep the same format (e.g., the formats shown in any of the examples herein) throughout the entire transformation process (e.g., after each phase).

Appendix F shows the IR after the following exemplary phases: CIL reader; Type Checker; MIR Lower; SSA Construction and Optimization; SSA Info Destruction; Lower; Linear Scan Register Allocation; Stack Allocation; Frame Generation; Switch Lower; Block Layout; Flow Optimization; Encoding, Listing, COFF Emission; and LIR Phases. The numbers on the right side show the line number of the source code associated with the IR instruction.

The phases and annotations shown in Appendix F and the other examples are exemplary only. Additional, fewer, or different phases can be used during the transformation process. Further, additional, fewer, or different annotation techniques can be used.

Additional phases can easily be added to the transformation (e.g., compilation) process. Thus, a developer or researcher can easily plug in new phases into a compiler or other software tool without recompiling the software tool (e.g., by loading a tool extension, such as a .DLL).

EXAMPLE 28

Exemplary Universal Data Flow Analogy

In any of the examples herein, the IR can be conceptualized as representing each instruction in software as data flow. For example, the IR can represent an instruction as a data flow operation effected by execution of the instruction. Such a universal approach can be advantageous because of the uniform form of instructions and explicitness of the instructions' representation of the represented software.

EXAMPLE 29

Exemplary Applications in Software Research

The availability of a general-purpose IR as described in any of the examples herein can be advantageous for software researchers. For example, if a software development environment supports a general-purpose IR, a researcher interested in investigating whether a proposed transformation results in measurable improvements can plug into the environment to analyze and modify the IR.

For example, an additional phase can be added to a compiler without having to re-build the compiler. Or, at any point during the software development process, a researcher can use software to analyze the IR to generate metrics of interest.

Also, because the IR can be used in any of a variety of target architectures and for any of a variety of programming languages, researchers need not re-write their algorithms to investigate results across platforms or languages. For example, once a tranformation technique is written to the IR, it can be applied to any of a number of languages or target architectures. In this way, researchers can focus on the purpose of their research, rather than spending time dealing with the idiosyncrasies of software development tools.

EXAMPLE 30

Exemplary In Situ Nature of IR Format

In any of the examples described herein, the IR format can be transformed in situ (e.g., in place). For example, annotations can be added without having to copy the IR from one location to another. Similarly, the IR can be refined (e.g., lowered) or otherwise transformed without having to copy the IR from one location to another.

Similarly, the format can allow graphs and other data structures to be threaded through the IR without having to copy the IR or create separate data structures.

EXAMPLE 31

Exemplary Technique for Interfacing with the IR Format

In any of the examples described herein, software development tools can analyze or modify the IR via properties of nodes (e.g., instruction nodes or operand nodes). For example, get and set methods can be called to examine or change properties of the nodes. Thus, the set of supported properties can be diminished, increased, or otherwise changed without having to modify the interface technique.

EXAMPLE 32

Exemplary General-Purpose Nature of IR Format

Figure 13:
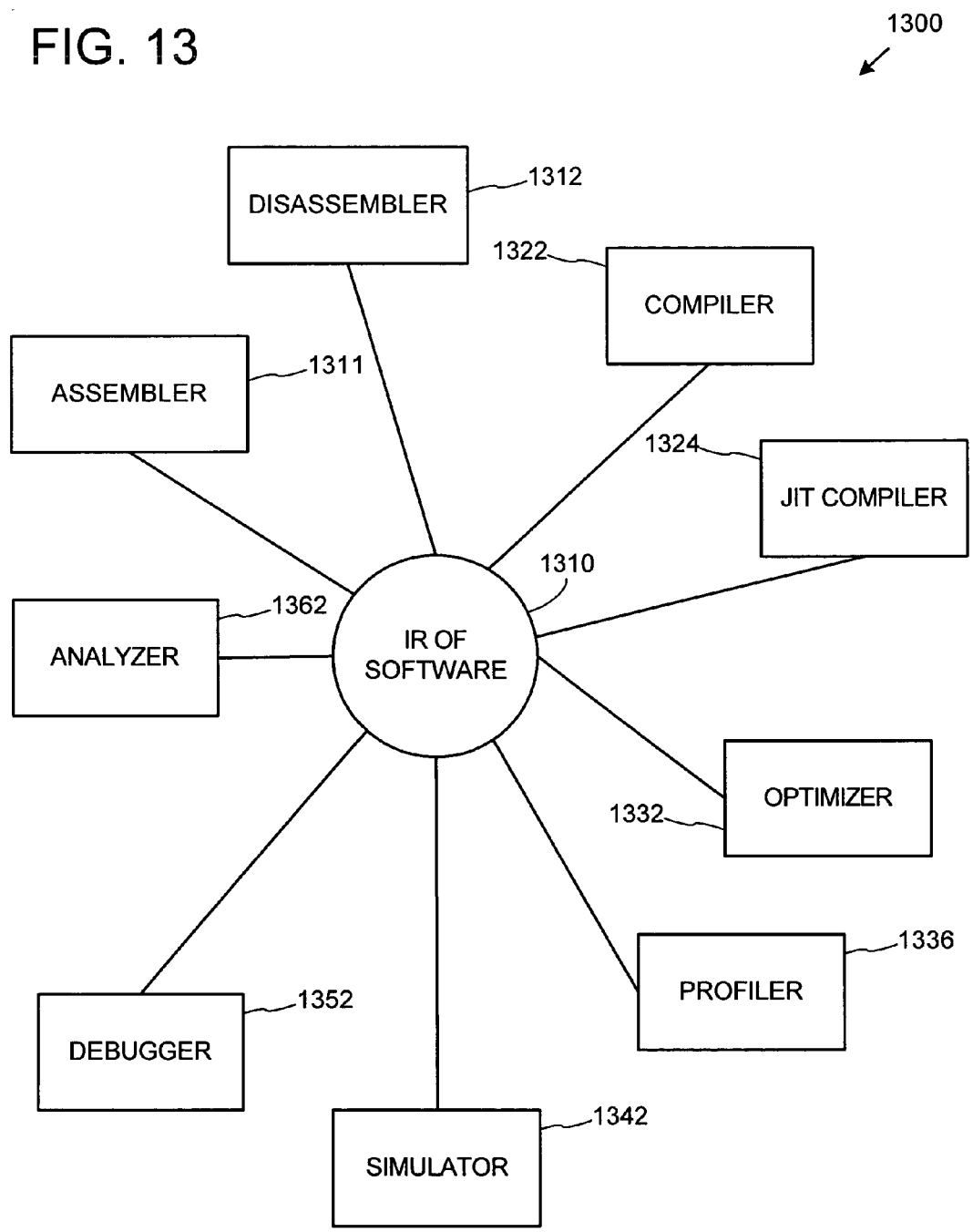
FIG. 13 is a block diagram showing relationships between an intermediate representation of software and various software development tools.

FIG. 13 shows relationships between an intermediate representation format of software and various software development tools. In the IR 1310, type information is maintained throughout lowering, control flow (e.g., including exception handling control flow) is explicitly represented in the IR 1310, and data flow is explicitly represented in the IR.

In the example, which uses an IR format incorporating any combination of the technologies described in the examples herein, an assembler 1311, a disassembler 1312, a compiler 1322, a JIT compiler 1324, an optimizer (e.g., a whole program optimizer) 1332, a profiler 1336, a simulator 1342, a debugger 1352, and an analyzer 1362 can all understand (e.g., traverse and modify) the IR format. Other tools (e.g., Pre-JIT compiler) can be included. In this way, the software development tools can work together more harmoniously. Also, from an engineering standpoint, using a common IR format greatly reduces duplication of effort and opportunity for error.

Further, because the IR format can represent software from any of a variety of languages executable on any of a variety of target architectures, effort expended to develop a feature in a software development tool written to the IR format can be leveraged to extend to other languages or target architectures.

Research results and commercial executable software products can thus be developed via the IR format.

EXAMPLE 33

Exemplary Computing Environment

Figure 14:
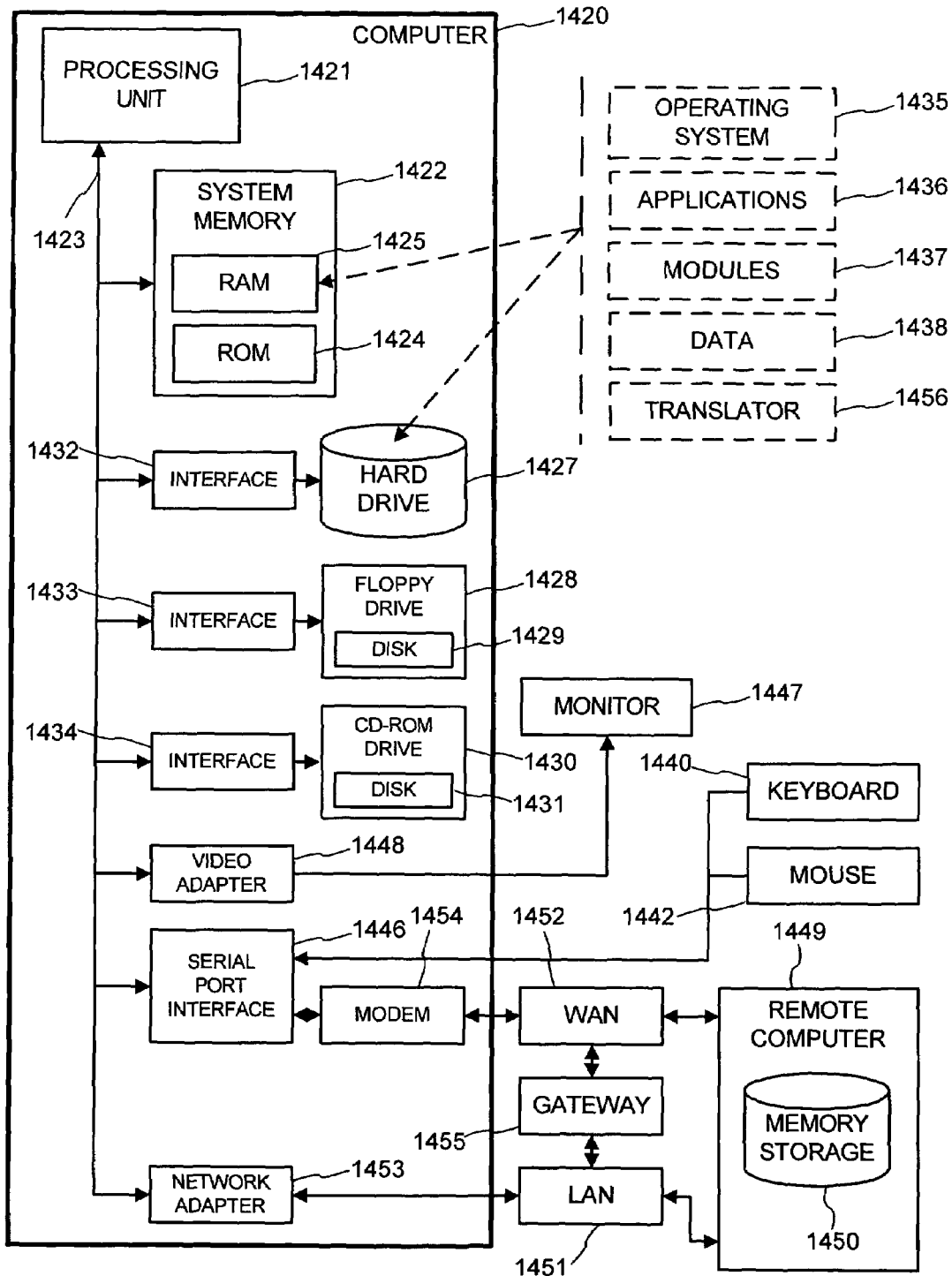
FIG. 14 is a block diagram showing an exemplary hardware environment in which the technologies can be implemented.

FIG. 14 and the following discussion are intended to provide a brief, general description of a suitable computing environment for an implementation of any of the examples. While the technologies are described in the general context of computer-executable instructions of a computer program that runs on a computer and/or network device, the technologies may also be implemented in combination with other program modules. Generally, program modules include routines, programs, components, data structures, etc. that perform particular tasks or implement particular abstract data types. Moreover, the technologies may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 14, an exemplary system for implementation includes a conventional computer 1420 (such as personal computers, laptops, servers, mainframes, and other variety computers) includes a processing unit 1421, a system memory 1422, and a system bus 1423 that couples various system components including the system memory to the processing unit 1421. The processing unit may be any of various commercially available processors, including any of the target architectures described herein. Dual microprocessors and other multi-processor architectures also can be used as the processing unit 1421.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1424 and random access memory (RAM) 1425. A basic input/output system (BIOS), containing the basic routines that help to transfer information between elements within the computer 1420, such as during start-up, is stored in ROM 1424.

The computer 1420 further includes a hard disk drive 1427, a magnetic disk drive 1428, e.g., to read from or write to a removable disk 1429, and an optical disk drive 1430, e.g., for reading a CD-ROM disk 1431 or to read from or write to other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide nonvolatile storage of data, data structures, computer-executable instructions, etc. for the computer 1420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1425, including an operating system 1435, one or more application programs 1436, other program modules 1437, and program data 1438; in addition to an implementation 1456.

A user may enter commands and information into the computer 1420 through a keyboard 1440 and pointing device, such as a mouse 1442. These and other input devices are often connected to the processing unit 1421 through a serial port interface 1446 that is coupled to the system bus, but may be connected by other interfaces, such as a parallel port, game port or a universal serial bus (USB). A monitor 1447 or other type of display device is also connected to the system bus 1423 via an interface, such as a video adapter 1448. In addition to the monitor, computers typically include other peripheral output devices (not shown), such as speakers and printers.

The computer 1420 operates in a networked environment using logical connections to one or more remote computers, such as a remote computer 1449. The remote computer 1449 may be a server, a router, a peer device or other common network node, and typically includes many or all of the elements described relative to the computer 1420, although only a memory storage device 1450 has been illustrated. The logical connections depicted include a local area network (LAN) 1451 and a wide area network (WAN) 1452. Such networking environments are commonplace in offices, enterprise-wide computer networks, intranets and the Internet.

When used in a LAN networking environment, the computer 1420 is connected to the local network 1451 through a network interface or adapter 1453. When used in a WAN networking environment, the computer 1420 typically includes a modem 1454 or other means for establishing communications (e.g., via the LAN 1451 and a gateway or proxy server 1455) over the wide area network 1452, such as the Internet. The modem 1454, which may be internal or external, is connected to the system bus 1423 via the serial port interface 1446. In a networked environment, program modules depicted relative to the computer 1420, or portions thereof, may be stored in the remote memory storage device. It will be appreciated that the network connections shown are exemplary and other means of establishing a communications link between the computers may be used.

ALTERNATIVES

Having described and illustrated the principles of our invention with reference to various embodiments, it will be recognized that the embodiments can be modified in arrangement and detail without departing from such principles. It should be understood that the programs, processes, or methods described herein are not related or limited to any particular type of computer apparatus, unless indicated otherwise.

Various types of general purpose or specialized computer apparatus may be used with or perform operations in accordance with the teachings described herein. Elements of the illustrated embodiment shown in software may be implemented in hardware and vice versa.

Techniques from one or more examples can be incorporated into any of the other examples.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

APPENDIX A (239 Lines)

```
IR after CIL Reader (flag cil)
    {-7}              =    START _foo           #2
    _a, _b, _c        =    ENTERFUNC _foo       #2
    t109              =    ADD _a, _b           #3
    t110              =    ADD t109, _c         #3
    _z                =    ASSIGN t110          #3
                           GOTO $L2             #4
$L2: (1 ref)                                    #4
                           EXITFUNC _foo        #4
                           END _foo, {-7}       #4
IR after Type Checker (flag Type Checker)
    {-7}              =    START _foo           #2
    _a, _b, _c        =    ENTERFUNC _foo       #2
    t109              =    ADD _a, _b           #3
    t110              =    ADD t109, _c         #3
    _z                =    ASSIGN t110          #3
                           GOTO $L2             #4
$L2: (1 ref)                                    #4
                           EXITFUNC _foo        #4
                           END _foo, {-7}       #4
IR after MIR Lower (flag MIRLower)
    {-7}              =    START _foo           #2
    _a, _b, _c        =    ENTERFUNC _foo       #2
    t109              =    ADD _a, _b           #3
    t110              =    ADD t109, _c         #3
    _z                =    ASSIGN t110          #3
                           GOTO $L2             #4
$L2: (1 ref)                                    #4
                           EXITFUNC _foo        #4
                           END _foo, {-7}       #4
IR after Ssa Construction and Optimization (flag Ssa)
= = = = Block 1 Pred( ) Succ(2) next 2 pre 1 post 8 iDom 1 df
    {-7}, {-1}        =    START _foo           #2
= = = = Block 2 Pred(1) Succ(3) prev 1 next 3 pre 2 post 7 iDom 1 df
    _a<3>, _b<2>, _c<1> = ENTERFUNC _foo        #2
```

APPENDIX A-continued (239 Lines)

```
    tv109-<5>         =    ADD _a<3>, _b<2>     #3
    tv110-<6>         =    ADD tv109-<5>, _c<1> #3
    _z<4>             =    ASSIGN tv110-<6>     #3
                           GOTO $L2             #4
= = = = Block 3 Pred(2) Succ(4) prev 2 next 4 pre 3 post 6 iDom 2 df
$L2: (1 ref)                                    #4
                           EXITFUNC _foo        #4
= = = = Block 4 Pred(3) Succ( ) prev 3 pre 4 post 5 iDom 3 df
                           END _foo, {-7}       #4
IR after Ssa Info Destruction (flag Ssa)
    {-7}              =    START _foo           #2
    _a<3>, _b<2>, _c<1> = ENTERFUNC _foo        #2
    t109              =    ADD _a, _b           #3
    t110              =    ADD t109, _c         #3
    _z<4>             =    ASSIGN t110          #3
                           GOTO $L2             #4
$L2: (1 ref)                                    #4
                           EXITFUNC _foo        #4
                           END _foo, {-7}       #4
IR after Lower (flag Lower)
    {-7}              =    START _foo           #2
    _a<3>, _b<2>, _c<1> = ENTERFUNC _foo        #2
                           PROLOGEND            #2
    tv109-(_rd)       =    mov _a[_FP]          #3
    tv109-(_rd)<5>, EFLAGS = add tv109-(_rd), _b[_FP]  #3
    tv110-(_rd)       =    mov tv109-(_rd)      #3
    tv110-(_rd)<6>, EFLAGS = add tv110-(_rd), _c[_FP]  #3
    _z[_FP]           =    mov tv110-(_rd)      #3
                           jmp $L2              #4
$L2: (1 ref)                                    #4
                           EPILOGSTART          #4
                           EXITFUNC _foo        #4
                           END _foo, {-7}       #4
IR after Linear Scan Register Allocation (flag LinearScan)
    {-7}              =    START _foo           #2
    _a<3>, _b<2>, _c<1> = ENTERFUNC _foo        #2
                           PROLOGEND            #2
    tv109-(EAX)       =    mov _a[_FP]          #3
    tv109-(EAX)<5>, EFLAGS = add tv109-(EAX), _b[_FP]  #3
    tv110-(EAX)       =    mov tv109-(EAX)      #3
    tv110-(EAX)<6>, EFLAGS = add tv110-(EAX), _c[_FP]  #3
    _z[_FP]           =    mov tv110-(EAX)      #3
                           jmp $L2              #4
$L2: (1 ref)                                    #4
                           EPILOGSTART          #4
                           EXITFUNC _foo        #4
                           END _foo, {-7}       #4
IR after Stack Allocation (flag StackAlloc)
    {-7}              =    START _foo           #2
    _a<3>, _b<2>, _c<1> = ENTERFUNC _foo        #2
                           PROLOGEND            #2
    tv109-(EAX)       =    mov _a[_FP]          #3
    tv109-(EAX)<5>, EFLAGS = add tv109-(EAX), _b[_FP]  #3
    tv110-(EAX)       =    mov tv109-(EAX)      #3
    tv110-(EAX)<6>, EFLAGS = add tv110-(EAX), _c[_FP]  #3
    _z[_FP]           =    mov tv110-(EAX)      #3
                           jmp $L2              #4
$L2: (1 ref)                                    #4
                           EPILOGSTART          #4
                           EXITFUNC _foo        #4
                           END _foo, {-7}       #4
IR after Frame Generation (flag Frame)
    {-7}              =    START _foo           #2
    _a<3>, _b<2>, _c<1> = ENTERFUNC _foo        #2
    [ESP], {ESP}      =    push EBP, {ESP}      #2
    EBP               =    mov ESP              #2
    [ESP], {ESP}      =    push ESP, {ESP}      #2
                           PROLOGEND            #2
    tv109-(EAX)       =    mov _a[EBP]          #3
    tv109-(EAX)<5>, EFLAGS = add tv109-(EAX), _b[EBP]  #3
    tv110-(EAX)       =    mov tv109-(EAX)      #3
    tv110-(EAX)<6>, EFLAGS = add tv110-(EAX), _c[EBP]  #3
    _z[EBP]           =    mov tv110-(EAX)      #3
                           jmp $L2              #4
```

APPENDIX A-continued (239 Lines)

```
$L2: (1 ref)
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
IR after Switch Lower (flag SwitchLower)
        {-7}                = START _foo                      #2
        _a<3>, _b<2>, _c<1> = ENTERFUNC _foo                  #2
        [ESP], {ESP}        = push EBP, {ESP}                 #2
        EBP                 = mov ESP                         #2
        [ESP], {ESP}        = push ESP, {ESP}                 #2
                              PROLOGEND                       #2
        tv109-(EAX)         = mov _a[EBP]                     #3
        tv109-(EAX)<5>, EFLAGS = add tv109-(EAX), _b[EBP]     #3
        tv110-(EAX)         = mov tv109-(EAX)                 #3
        tv110-(EAX)<6>, EFLAGS = add tv110-(EAX), _c[EBP]     #3
        _z[EBP]             = mov tv110-(EAX)                 #3
                              jmp $L2                         #4
$L2: (1 ref)
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
IR after Block Layout (flag Block Layout)
        {-7}                = START _foo                      #2
        _a<3>, _b<2>, _c<1> = ENTERFUNC _foo                  #2
        [ESP], {ESP}        = push EBP, {ESP}                 #2
        EBP                 = mov ESP                         #2
        [ESP], {ESP}        = push ESP, {ESP}                 #2
                              PROLOGEND                       #2
        tv109-(EAX)         = mov _a[EBP]                     #3
        tv109-(EAX) <5>, EFLAGS = add tv109-(EAX), _b[EBP]    #3
        tv110-(EAX)         = mov tv109-(EAX)                 #3
        tv110-(EAX)<6>, EFLAGS = add tv110-(EAX), _c[EBP]     #3
        _z[EBP]             = mov tv110-(EAX)                 #3
                              jmp $L2                         #4
$L2: (1 ref)
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
IR after Flow Optimization (flag FlowOpts)
        {-7}                = START _foo                      #2
        _a<3>, _b<2>, _c<1> = ENTERFUNC _foo                  #2
        [ESP], {ESP}        = push EBP, {ESP}                 #2
        EBP                 = mov ESP                         #2
        [ESP], {ESP}        = push ESP, {ESP}                 #2
                              PROLOGEND                       #2
        tv109-(EAX)         = mov _a[EBP]                     #3
        tv109-(EAX)<5>, EFLAGS = add tv109-(EAX), _b[EBP]     #3
        tv110-(EAX)         = mov tv109-(EAX)                 #3
        tv110-(EAX)<6>, EFLAGS = add tv110-(EAX), _c[EBP]     #3
```

APPENDIX A-continued (239 Lines)

```
        _z[EBP]             = mov tv110-(EAX)                 #3
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
IR after Encoding, Listing, COFF Emission (flag Encode)
        {-7}                = START _foo                      #2
        _a<3>, _b<2>, _c<1> = ENTERFUNC _foo                  #2
        [ESP], {ESP}        = push EBP, {ESP}                 #2
        EBP                 = mov ESP                         #2
        [ESP], {ESP}        = push ESP, {ESP}                 #2
                              PROLOGEND                       #2
        tv109-(EAX)         = mov _a[EBP]                     #3
        tv109-(EAX)<5>, EFLAGS = add tv109-(EAX), _b[EBP]     #3
        tv110-(EAX)<6>, EFLAGS = add tv110-(EAX), _c[EBP]     #3
        _z[EBP]             = mov tv110-(EAX)                 #3
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
IR after LIR Phases (flag LIR Phases) [SubPhaseList]
        {-7}                = START _foo                      #2
        _a<3>, _b<2>, _c<1> = ENTERFUNC _foo                  #2
        [ESP], {ESP}        = push EBP, {ESP}                 #2
        EBP                 = mov ESP                         #2
        [ESP], {ESP}        = push ESP, {ESP}                 #2
                              PROLOGEND                       #2
        tv109-(EAX)         = mov _a[EBP]                     #3
        tv109-(EAX)<5>, EFLAGS = add tv109-(EAX), _b[EBP]     #3
        tv110-(EAX)<6>, EFLAGS = add tv110-(EAX), _c[EBP]     #3
        _z[EBP]             = mov tv110-(EAX)                 #3
                              EPILOGSTART                    #4
        ESP                 = mov EBP                         #4
        EBP, {ESP}          = pop [ESP], {ESP}                #4
        {ESP}               = ret {ESP}                       #4
                              EXITFUNC _foo                   #4
                              END _foo, {-7}                  #4
```

APPENDIX B (294 Lines)

```
IR after CIL Reader (flag cil)
        {-7}                = START _foo                      #3
        _a, _b              = ENTERFUNC _foo                  #3
        t107                = CMP(NE) _a, _b                  #4
                              CBRANCH(NE) t107, $L3, $L2      #4
$L3: (1 ref)                                                  #4
        t108                = ASSIGN _a                       #4
        t109                = ADD t108, 1                     #4
        _a                  = ASSIGN t109                     #4
                              GOTO $L2                        #4
```

APPENDIX B-continued (294 Lines)

```
$L2: (2 refs)                                                      #4
                            GOTO $L4                               #5
$L4: (1 ref)                                                       #5
                            EXITFUNC _foo                          #5
                            END _foo, {-7}                         #5
IR after Type Checker (flag Type Checker)
        {-7}        =       START _foo                             #3
        _a, _b      =       ENTERFUNC _foo                         #3
        t107        =       CMP(NE) _a, _b                         #4
                            CBRANCH(NE) t107, $L3, $L2             #4
$L3: (1 ref)                                                       #4
        t108        =       ASSIGN _a                              #4
        t109        =       ADD t108, 1                            #4
        _a          =       ASSIGN t109                            #4
                            GOTO $L2                               #4
$L2: (2 refs)                                                      #4
                            GOTO $L4                               #5
$L4: (1 ref)                                                       #5
                            EXITFUNC _foo                          #5
                            END _foo, {-7}                         #5
IR after MIR Lower (flag MIRLower)
        {-7}        =       START _foo                             #3
        _a, _b      =       ENTERFUNC _foo                         #3
        t107        =       CMP(NE) _a, _b                         #4
                            CBRANCH(NE) t107, $L3, $L2             #4
$L3: (1 ref)                                                       #4
        t108        =       ASSIGN _a                              #4
        t109        =       ADD t108, 1                            #4
        _a          =       ASSIGN t109                            #4
                            GOTO $L2                               #4
$L2: (2 refs)                                                      #4
                            GOTO $L4                               #5
$L4: (1 ref)                                                       #5
                            EXITFUNC _foo                          #5
                            END _foo, {-7}                         #5
IR after Ssa Construction and Optimization (flag Ssa)
= = = = Block 1 Pred( ) Succ(2) next 2 pre 1 post 12 iDom 1 df
        {-7}, {-1}  =       START _foo                             #3
= = = = Block 2 Pred(1) Succ(4,3) prev 1 next 3 pre 2 post 11 iDom 1 df
        _a<2>, _b<1> =      ENTERFUNC _foo                         #3
        tv107-<4>   =       CMP(NE) _a<2>, _b<1>                   #4
                            CBRANCH(NE) tv107-<4>, $L3, $L2        #4
= = = = Block 3 Pred(2) Succ(4) prev 2 next 4 pre 9 post 10 iDom 2 df 4
$L3: (1 ref)                                                       #4
        tv108-<5>   =       ASSIGN _a<2>                           #4
        tv109-<6>   =       ADD tv108-<5>, 1                       #4
        _a<3>       =       ASSIGN tv109-<6>                       #4
                            GOTO $L2                               #4
= = = = Block 4 Pred(3,2) Succ(5) prev 3 next 5 pre 3 post 8 iDom 2 df
$L2: (2 refs)                                                      #4
                            GOTO $L4                               #5
= = = = Block 5 Pred(4) Succ(6) prev 4 next 6 pre 4 post 7 iDom 4 df
$L4 : (1 ref)                                                      #5
                            EXITFUNC _foo                          #5
= = = = Block 6 Pred(5) Succ( ) prev 5 pre 5 post 6 iDom 5 df
                            END _foo, {-7}                         #5
IR after Ssa Info Destruction (flag Ssa)
        {-7}        =       START _foo                             #3
        _a<2>, _b<1> =      ENTERFUNC _foo                         #3
        t107        =       CMP(NE) _a, _b                         #4
                            CBRANCH(NE) t107, $L3, $L2             #4
$L3: (1 ref)                                                       #4
        t108        =       ASSIGN _a                              #4
        t109        =       ADD t108, 1                            #4
        _a<3>       =       ASSIGN t109                            #4
                            GOTO $L2                               #4
$L2: (2 refs)                                                      #4
                            GOTO $L4                               #5
$L4: (1 ref)                                                       #5
                            EXITFUNC _foo                          #5
                            END _foo, {-7}                         #5
```

APPENDIX B-continued

| (294 Lines) |
|---|

```
IR after Lower (flag Lower)
    {-7}            =               START _foo                      #3
    _a<2>, _b<1> = ENTERFUNC _foo                                    #3
                                    PROLOGEND                       #3
    t110(_rd)       =               mov _b[_FP]                     #4
    t107(EFLAGS) = cmp(NE) _a[_FP], t110(_rd)                       #4
                                    jcc(NE) t107(EFLAGS), $L3, $L2  #4
$L3: (1 ref)                                                         #4
    t108(_rd)       =               mov _a[_FP]                     #4
    tv109-(_rd)     =               mov t108(_rd)                   #4
    tv109-(_rd)<6>, EFLAGS = add tv109-(_rd), 1                     #4
    _a[_FP]         =               mov tv109-(_rd)                 #4
                                    jmp $L2                         #4
$L2: (2 refs)                                                        #4
                                    jmp $L4                         #5
$L4: (1 ref)                                                         #5
                                    EPILOGSTART                     #5
                                    EXITFUNC _foo                   #5
                                    END _foo, {-7}                  #5
IR after Linear Scan Register Allocation (flag LinearScan)
    {-7}            =               START _foo                      #3
    _a<2>, _b<1> = ENTERFUNC _foo                                    #3
                                    PROLOGEND                       #3
    t110(EAX)       =               mov _b[_FP]                     #4
    t107(EFLAGS) =                  cmp(NE) _a[_FP], t110(EAX)      #4
                                    jcc(NE) t107(EFLAGS), $L3, $L2  #4
$L3: (1 ref)                                                         #4
    t108(EAX)       =               mov _a[_FP]                     #4
    tv109-(EAX)     = mov t108(EAX)                                 #4
    tv109-(EAX)<6>, EFLAGS = add tv109-(EAX), 1                     #4
    _a[_FP]         =               mov tv109-(EAX)                 #4
                                    jmp $L2                         #4
$L2: (2 refs)                                                        #4
                                    jmp $L4                         #5
$L4: (1 ref)                                                         #5
                                    EPILOGSTART                     #5
                                    EXITFUNC _foo                   #5
                                    END _foo, {-7}                  #5
IR after Stack Allocation (flag StackAlloc)
    {-7}            =               START _foo                      #3
    _a<2>, _b<1> = ENTERFUNC _foo                                    #3
                                    PROLOGEND                       #3
    t110(EAX)       =               mov _b[_FP]                     #4
    t107(EFLAGS) =                  cmp(NE) _a[_FP], t110(EAX)      #4
                                    jcc(NE) t107(EFLAGS), $L3, $L2  #4
$L3: (1 ref)                                                         #4
    t108(EAX)       =               mov _a[_FP]                     #4
    tv109-(EAX)     =               mov t108(EAX)                   #4
    tv109-(EAX)<6>, EFLAGS = add tv109-(EAX), 1                     #4
    _a[_FP]         =               mov tv109-(EAX)                 #4
                                    jmp $L2                         #4
$L2: (2 refs)                                                        #4
                                    jmp $L4                         #5
$L4: (1 ref)                                                         #5
                                    EPILOGSTART                     #5
                                    EXITFUNC _foo                   #5
                                    END _foo, {-7}                  #5
IR after Frame Generation (flag Frame)
    {-7}            =               START _foo                      #3
    _a<2>, _b<1> = ENTERFUNC _foo                                    #3
    [ESP] , {ESP} = push EBP, {ESP}                                 #3
    EBP             =               mov ESP                         #3
                                    PROLOGEND                       #3
    t110(EAX)       =               mov _b[EBP]                     #4
    t107(EFLAGS) =                  cmp(NE) _a[EBP], t110(EAX)      #4
                                    jcc(NE) t107(EFLAGS), $L3, $L2  #4
$L3: (1 ref)                                                         #4
    t108(EAX)       =               mov _a[EBP]                     #4
    tv109-(EAX)     =               mov t108(EAX)                   #4
    tv109-(EAX)<6>, EFLAGS = add tv109-(EAX), 1                     #4
    _a[EBP]         =               mov tv109-(EAX)                 #4
                                    jmp $L2                         #4
```

APPENDIX B-continued (294 Lines)

```
$L2: (2 refs)                                                    #4
                              jmp $L4                            #5
$L4: (1 ref)                                                     #5
                              EPILOGSTART                        #5
     EBP, {ESP}    =          pop [ESP], {ESP}                   #5
     {ESP}         =          ret {ESP}                          #5
                              EXITFUNC _foo                      #5
                              END _foo, {-7}                     #5
IR after Switch Lower (flag SwitchLower)
     {-7}          =          START _foo                         #3
     _a<2>, _b<1> = ENTERFUNC _foo                               #3
     [ESP], {ESP} = push EBP, {ESP}                              #3
     EBP           =          mov ESP                            #3
                              PROLOGEND                          #3
     t110(EAX)     =          mov _b[EBP]                        #4
     t107(EFLAGS)  =          cmp(NE) _a[EBP], t110(EAX)         #4
                              jcc(NE) t107(EFLAGS), $L3, $L2     #4
$L3: (1 ref)                                                     #4
     t108(EAX)     =          mov _a[EBP]                        #4
     tv109-(EAX)   =          mov t108(EAX)                      #4
     tv109-(EAX)<6>, EFLAGS = add tv109-(EAX), 1                 #4
     _a[EBP]       =          mov tv109-(EAX)                    #4
                              jmp $L2                            #4
$L2: (2 refs)                                                    #4
                              jmp $L4                            #5
$L4: (1 ref)                                                     #5
                              EPILOGSTART                        #5
     EBP, {ESP}    =          pop [ESP], {ESP}                   #5
     {ESP}         =          ret {ESP}                          #5
                              EXITFUNC _foo                      #5
                              END _foo, {-7}                     #5
IR after Block Layout (flag Block Layout)
     {-7}          =          START _foo                         #3
     _a<2>, _b<1> = ENTERFUNC _foo                               #3
     [ESP], {ESP} = push EBP, {ESP}                              #3
     EBP           =          mov ESP                            #3
                              PROLOGEND                          #3
     t110(EAX)     =          mov _b[EBP]                        #4
     t107(EFLAGS)  =          cmp(NE) _a[EBP], t110(EAX)         #4
                              jcc(NE) t107(EFLAGS), $L3          #4
                              jmp $L2                            #4
$L3: (1 ref)                                                     #4
     t108(EAX)     =          mov _a[EBP]                        #4
     tv109-(EAX)   =          mov t108(EAX)                      #4
     tv109-(EAX)<6>, EFLAGS = add tv109-(EAX), 1                 #4
     _a[EBP]       =          mov tv109-(EAX)                    #4
                              jmp $L2                            #4
$L2: (2 refs)                                                    #4
                              jmp $L4                            #5
$L4: (1 ref)                                                     #5
                              EPILOGSTART                        #5
     EBP, {ESP}    =          pop [ESP], {ESP}                   #5
     {ESP}         =          ret {ESP}                          #5
                              EXITFUNC _foo                      #5
                              END _foo, {-7}                     #5
IR after Flow Optimization (flag FlowOpts)
     {-7}          =          START _foo                         #3
     _a<2>, _b<1> = ENTERFUNC _foo                               #3
     [ESP] , {ESP} = push EBP, {ESP}                             #3
     EBP           =          mov ESP                            #3
                              PROLOGEND                          #3
     t110(EAX)     =          mov _b[EBP]                        #4
     t107(EFLAGS)  =          cmp(NE) _a[EBP], t110(EAX)         #4
                              jcc(EQ) t107(EFLAGS), $L4          #4
     t108(EAX)     =          mov _a[EBP]                        #4
     tv109-(EAX)   =          mov t108(EAX)                      #4
     tv109-(EAX)<6>, EFLAGS = add tv109-(EAX), 1                 #4
     _a[EBP]       =          mov tv109-(EAX)                    #4
$L4: (1 ref)                                                     #5
                              EPILOGSTART                        #5
     EBP, {ESP}    =          pop [ESP], {ESP}                   #5
     {ESP}         =          ret {ESP}                          #5
                              EXITFUNC _foo                      #5
                              END _foo, {-7}                     #5
IR after Encoding, Listing, COFF Emission (flag Encode)
     {-7}          =          START _foo                         #3
     _a<2>, _b<1> = ENTERFUNC _foo                               #3
```

APPENDIX B-continued (294 Lines)

| | | | |
|---|---|---|---|
| [ESP], {ESP} = push EBP, {ESP} | | | #3 |
| EBP | = | mov ESP | #3 |
| | | PROLOGEND | #3 |
| t110(EAX) | = | mov __b[EBP] | #4 |
| t107(EFLAGS) | = | cmp(NE) __a[EBP], t110(EAX) | #4 |
| | | je(EQ) t107(EFLAGS), $L4 | #4 |
| tv108-(EAX)<5> = mov __a[EBP] | | | #4 |
| tv109-(EAX)<6>, EFLAGS = add tv109-(EAX), 1 | | | #4 |
| __a[EBP] | = | mov tv109-(EAX) | #4 |
| $L4: (1 ref) | | | #5 |
| | | EPILOGSTART | #5 |
| EBP, {ESP} | = | pop [ESP], {ESP} | #5 |
| {ESP} | = | ret {ESP} | #5 |
| | | EXITFUNC __foo | #5 |
| | | END __foo, {-7} | #5 |
| IR after LIR Phases (flag LIR Phases) [SubPhaseList] | | | |
| {-7} | = | START __foo | #3 |
| __a<2>, __b<1> = ENTERFUNC __foo | | | #3 |
| [ESP], {ESP} = push EBP, {ESP} | | | #3 |
| EBP | = | mov ESP | #3 |
| | | PROLOGEND | #3 |
| t110(EAX) | = | mov __b[EBP] | #4 |
| t107(EFLAGS) | = | cmp(NE) __a[EBP], t110(EAX) | #4 |
| | | je(EQ) t107(EFLAGS), $L4 | #4 |
| tv108-(EAX)<5> = mov __a[EBP] | | | #4 |
| tv109-(EAX)<6>, EFLAGS = add tv109-(EAX), 1 | | | #4 |
| __a[EBP] | = | mov tv109-(EAX) | #4 |
| $L4: (1 ref) | | | #5 |
| | | EPILOGSTART | #5 |
| EBP, {ESP} | = | pop [ESP], {ESP} | #5 |
| {ESP} | = | ret {ESP} | #5 |
| | | EXITFUNC __foo | #5 |
| | | END __foo, {-7} | #5 |

APPENDIX C

| | | | |
|---|---|---|---|
| __a.i32, __b.i32 | = | ENTER __foo | #4 |
| t107.cond | = | CMP(LT) __a.i32, __b.i32 | #7 |
| | | CBRANCH(LT) t107.cond, L2 , L1 | #7 |
| L2: | | | #7 |
| t108.i32 | = | ADD __a.i32, 1.i32 | #9 |
| __r.i32 | = | ASSIGN t108.i32 | #9 |
| | | GOTO L3 | #11 |

APPENDIX C-continued

| | | | |
|---|---|---|---|
| L1: | | | #7 |
| t109.i32 | = | ADD __b.i32, 1.i32 | #13 |
| __r.i32 | = | ASSIGN t109.i32 | #13 |
| | | GOTO L3 | #11 |
| L3: | | | #11 |
| | | RETURN __r.i32 | #16 |
| | | GOTO L4 | #16 |
| L4: | | | #16 |
| | | EXIT __foo | #17 |

APPENDIX D

| | | | |
|---|---|---|---|
| <1>__a.i32, <2>__b.i32 | = | ENTER __foo | #4 |
| <3>t107.cond | = | CMP(LT) <1>__a.i32, <2>__ | #7 |
| | | CBRANCH(LT) <3>t107.cond, L2 , L1 | #7 |
| L2: | | | #7 |
| <4>t108.i32 | = | ADD <1>__a.i32, 1.i32 | #9 |
| <5>__r.i32 | = | ASSIGN <4>t108.i32 | #9 |
| | | GOTO L3 | #11 |
| L1: | | | #7 |
| <6>t109.i32 | = | ADD <2>__b.i32, 1.i32 | #13 |
| <7>__r.i32 | = | ASSIGN <6>t109.i32 | #13 |
| | | GOTO L3 | #11 |
| L3: | | | #11 |
| <8>__r.i32 | = | PHI <5>__r.i32, <7>__r.i32 | #16 |
| | | RETURN <8>__r.i32 | #16 |
| | | GOTO L4 | #16 |
| L4: | | | #16 |
| | | EXIT __foo | #17 |

APPENDIX E

```
/* source code */
#include <stdio.h>
#include <stdlib.h>
#ifndef ITER
#define ITER 6000
#endif
/*
{$SET NATIVE}
{$DEBUG-}
{$R-}
(*#B-*)
program eightqueens (input, output);
*/
#define        true            1
#define        false           0
typedef        int     aarray[9], barray[17],
                       carray[15], xarray[9];
aarray    a;
barray    b;
carray    c;
xarray    x;
#if defined(PROTOTYPES_REQUIRED)
try(int i, int* q, barray a, aarray b)
#else
try(i, q, a, b)
int            i, *q;
aarray         b;
barray         a;
#endif
{
    int        j ;
    j = 0;
    *q = false;
    while ((*q == false) && (j != 8))
    {
        j = j + 1;
        *q = false;
        if ((b[j] == true) && (a[i+j] == true) && (c[i-j + 7] ==
true))
        {
            x[i] = j;
            b[j] = false;
            a[i+j] = false;
            c[i-j + 7] = false;
            if (i < 8)
            {
                try(i+1,&*q,a,b) ;
                if (*q == false)
                {
                    b[j] = true;
                    a[i+j] = true;
                    c[i-j+7] = true;
                }
            }
            else *q = true;
        }
    }
}
main( )
{
int        i,j ,q;
int        doitagain ;
#ifdef NTR4000
    int iNTR4000;
    for ( iNTR4000 = 0; iNTR4000 < 6; iNTR4000++ )
    {
#endif
    for (doitagain = 1; doitagain <= ITER; doitagain++)
    {
        i = 0;
        while (i <= 16 )
        {
            if ((i >= 1) && (i <= 8)) a[i] = true;
            if (i >= 2) b[i] = true;
            if (i <= 14) c[i] = true;
            i = i + 1;
        }
        try(1, &q, b, a);
        if (q == true)
```

APPENDIX E-continued

```
        { i = 1;
            while (i <= 8)
                i = i+1;
        }
        else
        {
            printf ("fail\n");
            exit (0);
        }
    } /* doitagain loop*/
    printf ("pass\n");
#ifdef NTR4000
    }
#endif
return(0);
}
```

We claim:

1. One or more computer-readable media having encoded thereon computer executable instructions for performing a method to generate an intermediate representation of software, the method comprising:
   storing, in a data structure, a plurality of instruction nodes representing a plurality of instructions of the software;
   wherein the instruction nodes are operable to represent the instructions in a machine-dependent manner and are further operable to represent the instructions in a machine-independent manner, using a single uniform format for both the instructions represented in the machine-dependant manner and the instructions represented in the machine-independent manner.

2. The computer-readable media of claim 1 wherein instructions are represented by the single uniform format for specifying at least the following for an instruction:
   an operator;
   any number of or no destination operands associated with the operator via the format; and
   any number of or no source operands associated with the operator via the format.

3. The computer-readable media of claim 1 wherein instructions are represented by the single uniform format for specifying an instruction node, zero or more destination operand nodes, and zero or more source operand nodes.

4. The computer-readable media of claim 1 wherein the method further comprises:
   storing, in the data structure, a plurality of operand nodes associated with the instruction nodes, wherein the operand nodes represent a plurality of operands of the instructions of the software.

5. The computer-readable media of claim 4 wherein at least one data flow graph is threaded through the operand nodes.

6. The computer-readable media of claim 5 wherein the data flow graph comprises an SSA representation.

7. The computer-readable media of claim 4 wherein the operand nodes are further operable to be annotated to explicitly indicate at least one data flow graph for the software.

8. The computer-readable media of claim 4 wherein the nodes of the data structure are further operable to store information explicitly indicating at least one data flow graph for the software without constructing a separate data structure therefor.

9. The computer-readable media of claim 4 wherein the nodes of the data structure are further operable to store information explicitly indicating at least one control flow graph for the software without constructing a separate data structure for the control flow graph.

10. The computer-readable media of claim 9 wherein the control graph for the software is indicated by associating at least one control flow operation to at least one target label via a control flow edge.

11. The computer-readable media of claim 9 wherein the control graph for the software is indicated by associating at least one exception causing instruction to at least one instance of exception handling code via a control flow edge.

12. The computer-readable media of claim 1 wherein the method further comprises:
storing, in the data structure, a representation of non-instruction data of the software stored as an instruction.

13. The computer-readable media of claim 12 wherein the method further comprises:
storing, in the data structure, a representation of instruction data of the software stored as a data instruction.

14. The computer-readable media of claim 1 wherein:
the data structure represents a lowered form of the software; and
at least one operand preserves type information specified in source code for the software.

15. The computer-readable media of claim 4 wherein:
at least one operand node is annotated with alias information.

16. One or more computer-readable media having encoded thereon computer executable instructions for performing a method comprising:
generating an intermediate representation of software derived from source code; and
generating annotations for a plurality of analyses of the software, wherein a single format accommodates the annotations, and wherein the single format is operable to represent instructions of the intermediate representation in a machine-dependent manner and a machine-independent manner.

17. The computer-readable media of claim 16 wherein the intermediate representation of the software comprises a graph threaded through nodes of the representation.

18. The computer-readable media of claim 17 wherein the graph comprises a control flow graph representing control flow for the software.

19. The computer-readable media of claim 17 wherein the graph comprises a data flow graph representing data flow for the software.

20. One or more computer-readable media having encoded thereon computer executable instructions for performing a method to generate an intermediate representation of software, the method comprising:
storing, in a data structure, a plurality of instruction nodes representing a plurality of instructions of the software, wherein at least one of the instruction nodes represents a control flow instruction and at least one of the instruction nodes represents an opcode, and wherein the plurality of instruction nodes are operable to represent the plurality of instructions in a machine-dependent manner and are further operable to represent the plurality of instructions in a machine-independent manner using a single uniform format for both the plurality of instructions represented in the machine-dependent manner and the plurality of instructions represented in the machine-independent manner;
for at least one of the instruction nodes, storing, in the data structure, one or more source operand nodes and one or more destination operand nodes, wherein at least one of the operand nodes represents a memory location and at least one of the operand nodes represents a label;
storing, in the data structure, one or more links explicitly representing control flow for the software, wherein the control flow includes exception handling control flow;
storing, in the data structure, one or more links explicitly representing data flow for the software;
storing, in the data structure, information associated with at least one operand node indicating alias information for a variable associated with the operand node; and
storing, in the data structure, at least one data instruction node of a same format as the instruction nodes but storing non-instruction data for the software.

21. The computer-readable media of claim 20 wherein the data structure is operable to represent the software in a machine-dependent and a machine-independent manner without changing format.

22. A system for software development, the system comprising:
means for representing software; and
means for analyzing the means for representing to analyze the software represented thereby;
wherein the means for representing is of a single format operable to represent the software in a machine-independent and a machine-dependent manner.

23. A method of processing a data structure storing an intermediate representation of software for a compiler, wherein the intermediate representation is of a single format, the method comprising:
conducting an analysis of the data structure; and
based on the analysis, taking an action without changing the single format;
wherein the single format is operable to represent the software in a machine-dependent and a machine-independent manner.

24. The method of claim 23 wherein the action comprises:
annotating the intermediate representation with data.

25. The method of claim 23 wherein the annotating is done in situ.

26. The method of claim 23 wherein the action comprises:
generating information about the software.

27. The method of claim 26 further comprising:
producing code for the software by traversing the data structure and generating object code for instructions therein.

28. On one or more computer readable media, a software product generated using the method of claim 26.

29. A method of processing a data structure encoded on one or more computer-readable media, wherein the data structure comprises a plurality of nodes, the method comprising:
starting at one of the nodes within the data structure; and
traversing to another of the nodes within the data structure;
wherein:
the data structure stores an intermediate representation of software using a single uniform format to represent both a machine-dependent and a machine-independent form of the software;
the data structure comprises a plurality of nodes representing instructions of the software; and
at least one node representing an instruction is associated with one or more source operands and one or more destination operands.

30. The method of claim 29 wherein the data structure is operable to represent operand types specified in source code in a low level representation of the software.

31. The method of claim 29 wherein the data structure is operable to explicitly represent control flow for the software.

32. The method of claim 31 wherein the control flow comprises exception handling, whereby the data structure is operable to explicitly represent control flow for exception handling of the software.

33. The method of claim 29 wherein the data structure is operable to explicitly represent data flow far the software.

34. The method of claim 29 wherein the data structure is operable to explicitly represent alias information for operands.

35. The method of claim 29 wherein the data structure comprises an association between a use of a variable and a definition of the variable.

36. The method of claim 29 further comprising:
based on analysis of the data structure, annotating the data structure with additional information.

37. The method of claim 36 wherein the annotating comprises associating an operand of one instruction with an operand of another instruction.

38. The method of claim 36 wherein the annotating comprises associating an instruction with another instruction.

39. The method of claim 29 further comprising:
based on analysis of the data structure, adding an instruction to the data structure.

40. The method of claim 29 further comprising:
based on analysis of the data structure, removing an instruction from the data structure.

41. The method of claim 29 further comprising:
based on analysis of the data structure, changing an instruction in the data structure.

42. On one or more computer-readable media, a software product generated using the method of claim 29.

43. A method of representing software, the method comprising:
representing each instruction and data element in a single format operable to represent each instruction and data element of the software in a machine-independent and a machine-dependent manner; and
representing each instruction as a data flow operation effected by execution of the instruction.

44. The method of claim 43 wherein representing each instruction as a data flow operation comprises explicitly representing side effects for the instruction.

45. A software development environment comprising:
one or more software development tools encoded on one or more computer-readable media;
wherein the software development tools are operable to generate or analyze an intermediate representation of software of a single format operable to represent software in a machine-independent and a machine-dependent manner.

* * * * *